US 011731252B2

(12) United States Patent
Schwartzkopf et al.

(10) Patent No.: US 11,731,252 B2
(45) Date of Patent: Aug. 22, 2023

(54) SCREW GUIDE AND RELATED METHOD OF USE

(71) Applicant: National Nail Corp., Grand Rapids, MI (US)

(72) Inventors: Todd E. A. Schwartzkopf, Hudsonville, MI (US); Christopher M. Colyn, Grandville, MI (US); Roger A. Vandenberg, Hudsonville, MI (US)

(73) Assignee: National Nail Corp., Grand Rapids, MI (US)

( * ) Notice: Subject to any disclaimer, the term of this patent is extended or adjusted under 35 U.S.C. 154(b) by 357 days.

(21) Appl. No.: 17/162,143

(22) Filed: Jan. 29, 2021

(65) Prior Publication Data

US 2022/0241937 A1  Aug. 4, 2022

(51) Int. Cl.
*B25B 23/00* (2006.01)
*E04F 21/22* (2006.01)

(52) U.S. Cl.
CPC ............ *B25B 23/005* (2013.01); *E04F 21/22* (2013.01)

(58) Field of Classification Search
CPC .............................. B25B 23/005; E04F 21/22
See application file for complete search history.

(56) References Cited

U.S. PATENT DOCUMENTS

| 126,366 A | 4/1872 | Wills |
| 137,414 A | 4/1873 | Burdick |
| 138,784 A | 5/1873 | Bourn |
| 138,646 A | 1/1877 | Dickinson |
| 411,202 A | 9/1889 | Rose |
| 876,399 A | 1/1908 | Robinson |
| 877,831 A | 1/1908 | Creedon |
| 984,323 A | 2/1911 | Vauclain |
| 1,714,738 A | 5/1929 | Smith |
| 1,879,459 A | 9/1932 | Pelton |
| 1,888,611 A | 11/1932 | Wolfson |
| 2,065,525 A | 12/1936 | Hamilton |

(Continued)

FOREIGN PATENT DOCUMENTS

| CA | 1242601 | 10/1988 |
| CH | 695482 A5 | 6/2006 |

(Continued)

OTHER PUBLICATIONS

DeckLock Limited Universal Decking Spacers, downloaded from http://www.hellotrade.com/decklock/universal-decking-spacers.html (viewed Jun. 8, 2017).

(Continued)

*Primary Examiner* — David B. Thomas
(74) *Attorney, Agent, or Firm* — Warner Norcross + Judd LLP

(57) ABSTRACT

A fastener guide is provided including a base plate that engages a first board, a guide member that maintains an advancing fastener at a preselected offset angle relative to the first board, and a retainer clip that engages a second board that is transverse to the first board. The retainer clip includes first and second prongs that resiliently hold the guide in place as the fastener is advanced at the offset angle, optionally without manual input so that a user can manipulate the fastener and a driving tool instead of holding the guide to align the fastener.
A related method of use is provided.

16 Claims, 15 Drawing Sheets

(56) References Cited

U.S. PATENT DOCUMENTS

| | | |
|---|---|---|
| 2,066,813 A | 1/1937 | Williams |
| 2,116,737 A | 5/1938 | Urbain |
| 2,129,975 A | 9/1938 | Urbain |
| 2,129,976 A | 9/1938 | Urbain et al. |
| 2,325,766 A | 8/1943 | Gisondi |
| 2,338,870 A | 1/1944 | Praeger |
| 2,519,987 A | 8/1950 | Wernette |
| 2,620,705 A | 12/1952 | Podvinecz et al. |
| 2,774,969 A | 12/1956 | Samples |
| 2,994,878 A | 8/1961 | Abrahamsen |
| 3,010,496 A | 11/1961 | Bruce |
| 3,012,247 A | 12/1961 | Sillars et al. |
| 3,020,602 A | 2/1962 | Siering |
| 3,147,484 A | 9/1964 | Nelson |
| 3,177,755 A | 4/1965 | Kahn |
| 3,207,023 A | 9/1965 | Knohl |
| 3,237,360 A | 3/1966 | Mills |
| 3,267,630 A | 8/1966 | Omholt |
| 3,284,117 A | 11/1966 | Meehan |
| 3,316,949 A | 5/1967 | Canfield |
| 3,331,180 A | 7/1967 | Vissing et al. |
| 3,357,295 A | 12/1967 | Smith |
| 3,360,176 A | 12/1967 | Gehl et al. |
| D212,505 S | 10/1968 | Guerrero |
| 3,439,464 A | 4/1969 | Omholt |
| 3,553,919 A | 1/1971 | Omholt |
| 3,577,694 A | 5/1971 | Omholt |
| 3,585,770 A * | 6/1971 | Maizler ............... E06B 1/6061 403/231 |
| 3,619,963 A | 11/1971 | Omholt |
| 3,713,264 A | 1/1973 | Morgan, Jr. |
| 3,738,218 A | 6/1973 | Gutshall |
| 3,760,547 A | 9/1973 | Brenneman |
| 3,942,405 A | 3/1976 | Wagner |
| 4,018,254 A | 4/1977 | DeCaro |
| 4,023,831 A | 5/1977 | Thompson |
| 4,068,554 A | 1/1978 | Hirabayashi |
| 4,117,644 A | 10/1978 | Weinar |
| 4,123,186 A | 10/1978 | Hoadley |
| 4,125,006 A | 11/1978 | Bueche' |
| 4,125,972 A | 11/1978 | Pate |
| 4,126,006 A | 11/1978 | Lewis |
| 4,146,071 A | 3/1979 | Mueller et al. |
| 4,154,172 A | 5/1979 | Curtis, Jr. |
| 4,170,430 A | 10/1979 | Mrotzek |
| 4,209,275 A | 6/1980 | Kim |
| 4,241,638 A | 12/1980 | Shimizu et al. |
| 4,266,914 A | 5/1981 | Dickinson |
| 4,281,494 A | 8/1981 | Weinar |
| 4,291,996 A | 9/1981 | Gilb |
| 4,296,580 A | 10/1981 | Weinar |
| 4,323,326 A | 4/1982 | Okada et al. |
| 4,329,099 A | 5/1982 | Shimizu et al. |
| 4,333,286 A | 6/1982 | Weinar |
| D269,156 S | 5/1983 | Slinkard |
| D271,941 S | 12/1983 | Calapp |
| 4,435,935 A | 3/1984 | Larrea |
| 4,439,077 A | 3/1984 | Godsted |
| 4,448,007 A | 5/1984 | Adams |
| 4,467,579 A | 8/1984 | Weinar |
| 4,497,148 A | 2/1985 | Lopez |
| 4,498,272 A | 2/1985 | Adams |
| 4,572,720 A | 2/1986 | Rockenfeller et al. |
| 4,586,862 A | 5/1986 | Yamasaki |
| 4,616,462 A | 10/1986 | Abendroth |
| 4,625,597 A | 12/1986 | Cast |
| 4,653,244 A | 3/1987 | Farrell |
| 4,701,066 A | 10/1987 | Beam et al. |
| 4,703,601 A | 11/1987 | Abendroth |
| 4,776,144 A | 10/1988 | Pardo |
| 4,831,808 A | 5/1989 | Wynar |
| 4,834,602 A | 5/1989 | Takasaki |
| 4,844,651 A | 7/1989 | Partridge |
| 4,925,141 A | 5/1990 | Classen |
| D315,668 S | 3/1991 | Murphy |
| 5,015,134 A | 5/1991 | Gotoh |
| D319,002 S | 8/1991 | Mirza et al. |
| 5,064,324 A | 11/1991 | Ragaller |
| 5,083,483 A | 1/1992 | Takagi |
| 5,184,497 A | 2/1993 | Hanlon et al. |
| 5,188,496 A | 2/1993 | Giannuzzi |
| 5,271,670 A | 12/1993 | Grabher |
| 5,282,708 A | 2/1994 | Giannuzzi |
| 5,322,396 A | 6/1994 | Blacker |
| 5,337,635 A | 8/1994 | Habermehl |
| 5,341,706 A | 8/1994 | Takagi |
| 5,351,586 A | 10/1994 | Habermehl et al. |
| 5,394,667 A | 3/1995 | Nystrom |
| D359,726 S | 6/1995 | Umeya et al. |
| 5,452,630 A | 9/1995 | Haas et al. |
| 5,469,767 A | 11/1995 | Habermehl |
| 5,531,142 A | 7/1996 | Adamo |
| 5,531,143 A | 7/1996 | Habermehl et al. |
| 5,568,753 A | 10/1996 | Habermehl et al. |
| 5,570,618 A | 11/1996 | Habermehl et al. |
| 5,660,016 A | 8/1997 | Erwin et al. |
| 5,687,624 A | 11/1997 | Tsuge et al. |
| D391,135 S | 2/1998 | Habermehl et al. |
| D393,201 S | 4/1998 | Hearidge et al. |
| 5,839,332 A | 11/1998 | Fujiyama et al. |
| 5,842,319 A | 12/1998 | Ravetto |
| 5,871,486 A | 2/1999 | Huebner et al. |
| 5,884,541 A | 3/1999 | Habermehl et al. |
| 5,904,079 A | 5/1999 | Tsuge et al. |
| 5,918,512 A | 7/1999 | Habermehl et al. |
| 5,927,163 A | 7/1999 | Habermehl et al. |
| 5,934,162 A | 8/1999 | Habermehl |
| D415,570 S | 10/1999 | Bradshaw et al. |
| 5,988,025 A | 11/1999 | Sasaki et al. |
| 5,997,209 A | 12/1999 | Sachs |
| 6,027,004 A | 2/2000 | Ramella et al. |
| 6,036,398 A | 3/2000 | Theodorou |
| D427,050 S | 6/2000 | Bryan |
| D428,326 S | 7/2000 | Nakamura |
| 6,089,132 A | 7/2000 | Habermehl |
| 6,098,442 A | 8/2000 | Walldorf et al. |
| 6,109,144 A | 8/2000 | Muro |
| 6,109,146 A | 8/2000 | Muro |
| D435,684 S | 12/2000 | Gary et al. |
| 6,158,939 A | 12/2000 | Grossberndt et al. |
| 6,230,385 B1 | 5/2001 | Nelson |
| 6,244,140 B1 | 6/2001 | Habermehl |
| 6,296,433 B1 | 10/2001 | Forsell et al. |
| D450,568 S | 11/2001 | Sachs |
| 6,314,699 B1 | 11/2001 | West |
| 6,322,307 B1 | 11/2001 | Glover |
| 6,328,516 B1 | 12/2001 | Hettich |
| 6,332,741 B1 | 12/2001 | Janusz |
| 6,345,940 B2 | 2/2002 | Anjanappa et al. |
| 6,394,712 B1 | 5/2002 | Weinstein et al. |
| 6,416,269 B1 | 7/2002 | Martel et al. |
| 6,418,681 B1 | 7/2002 | Dunks |
| 6,418,693 B2 | 7/2002 | Ballard |
| 6,425,306 B1 | 7/2002 | Habermehl |
| 6,439,085 B1 | 8/2002 | Habermehl et al. |
| 6,453,780 B2 | 9/2002 | Habermehl |
| 6,470,641 B1 | 10/2002 | Faure |
| 6,481,937 B1 | 11/2002 | Sommerfeld et al. |
| 6,484,467 B2 | 11/2002 | Crout |
| 6,490,838 B2 | 12/2002 | Summerford |
| D469,007 S | 1/2003 | Chen et al. |
| 6,514,026 B1 | 2/2003 | Gerhard |
| D476,555 S | 7/2003 | Niwa |
| 6,592,015 B1 | 7/2003 | Gostylla et al. |
| 6,594,961 B2 | 7/2003 | Leines |
| 6,601,480 B1 | 8/2003 | Habermehl |
| 6,604,901 B1 | 8/2003 | Grossberndt et al. |
| 6,623,228 B1 | 9/2003 | Hettich et al. |
| 6,647,638 B1 | 11/2003 | Doyal |
| 6,651,398 B2 | 11/2003 | Gregori |
| 6,651,400 B1 | 11/2003 | Murphy |
| 6,666,638 B2 | 12/2003 | Craven |
| 6,675,545 B2 | 1/2004 | Chen et al. |
| 6,698,971 B1 | 3/2004 | Wilhelmi |

(56) References Cited

U.S. PATENT DOCUMENTS

| | | |
|---|---|---|
| 6,711,864 B2 | 3/2004 | Erwin |
| 6,763,643 B1 | 7/2004 | Martensson |
| 6,769,332 B2 | 8/2004 | Muro |
| 6,843,402 B2 | 1/2005 | Sims et al. |
| 6,871,467 B2 | 3/2005 | Hafner |
| 6,887,023 B1 | 5/2005 | Lu et al. |
| 6,915,724 B2 | 7/2005 | Kigel et al. |
| 6,941,635 B2 | 9/2005 | Craven |
| 6,941,847 B2 | 9/2005 | Habermehl et al. |
| 6,986,934 B2 | 1/2006 | Chen et al. |
| 6,993,875 B2 | 2/2006 | Rudduck |
| D516,904 S | 3/2006 | Kendrick |
| D519,024 S | 4/2006 | Knight et al. |
| D520,352 S | 5/2006 | Knight et al. |
| 7,037,059 B2 | 5/2006 | Dicke |
| 7,044,460 B2 | 5/2006 | Bolton |
| 7,052,200 B2 | 5/2006 | Harris |
| 7,073,303 B2 | 7/2006 | Baker |
| 7,090,453 B2 | 8/2006 | Lin |
| 7,156,600 B2 | 1/2007 | Panasik et al. |
| 7,165,481 B2 | 1/2007 | Kikuchi |
| 7,168,213 B2 | 1/2007 | Rudduck et al. |
| 7,231,854 B2 | 6/2007 | Kikuchi |
| D547,169 S | 7/2007 | Harris |
| D557,130 S | 12/2007 | Kashikura et al. |
| D557,131 S | 12/2007 | Liu |
| D564,871 S | 3/2008 | Pitcher |
| 7,344,057 B2 | 3/2008 | Dion et al. |
| D567,644 S | 4/2008 | Liu |
| 7,398,623 B2 | 7/2008 | Martel et al. |
| 7,424,840 B1 | 9/2008 | Huang |
| 7,444,792 B2 | 11/2008 | Matson |
| 7,454,996 B2 | 11/2008 | Hsu |
| D581,776 S | 12/2008 | Yin-Feng |
| 7,487,699 B2 | 2/2009 | Xu |
| D592,946 S | 5/2009 | Johnson |
| 7,533,500 B2 | 5/2009 | Morton et al. |
| 7,546,717 B2 | 6/2009 | Juan Puerta |
| 7,578,105 B2 | 8/2009 | Eberle, III |
| 7,600,353 B2 | 10/2009 | Hafner |
| D604,153 S | 11/2009 | Wantz |
| 7,682,118 B2 | 3/2010 | Gong et al. |
| 7,682,119 B2 | 3/2010 | Chen |
| 7,695,228 B2 | 4/2010 | Craven |
| D614,942 S | 5/2010 | Gaudron |
| 7,721,503 B2 | 5/2010 | Pervan et al. |
| D619,880 S | 7/2010 | MacDonald et al. |
| 7,779,765 B2 | 8/2010 | Donnell, Jr. et al. |
| 7,805,902 B2 | 10/2010 | Martel |
| 7,841,145 B2 | 11/2010 | Pervan et al. |
| 7,841,150 B2 | 11/2010 | Pervan |
| D629,679 S | 12/2010 | Riddell et al. |
| 7,866,236 B2 | 1/2011 | Hsu |
| RE42,207 E | 3/2011 | Janusz |
| D634,186 S | 3/2011 | Kemper |
| 7,908,816 B2 | 3/2011 | Grafenauer et al. |
| D637,071 S | 5/2011 | Gaudron et al. |
| D637,896 S | 5/2011 | Dotsey |
| 7,950,312 B2 | 5/2011 | Matthiesen et al. |
| 7,980,041 B2 | 7/2011 | Pervan et al. |
| 7,992,469 B2 | 8/2011 | Chang et al. |
| D647,393 S | 10/2011 | Carrillo, Sr. et al. |
| 8,042,311 B2 | 10/2011 | Pervan et al. |
| 8,079,196 B2 | 12/2011 | Pervan |
| D651,503 S | 1/2012 | Ellis |
| 8,162,196 B2 | 4/2012 | Gasser et al. |
| 8,192,124 B2 | 6/2012 | Wolpert et al. |
| D662,808 S | 7/2012 | Vandenberg |
| D664,836 S | 8/2012 | Kikuchi |
| 8,245,478 B2 | 8/2012 | Bergelin et al. |
| 8,336,272 B2 | 12/2012 | Prager et al. |
| 8,348,571 B2 | 1/2013 | Shih |
| 8,359,805 B2 | 1/2013 | Pervan et al. |
| 8,360,702 B2 | 1/2013 | Yu |
| D675,512 S | 2/2013 | Gary et al. |
| 8,382,414 B2 | 2/2013 | Vandenberg |
| D677,147 S | 3/2013 | Vandenberg |
| 8,387,327 B2 | 3/2013 | Pervan |
| 8,480,343 B2 | 7/2013 | Vandenberg |
| 8,499,521 B2 | 8/2013 | Pervan et al. |
| 8,511,031 B2 | 8/2013 | Bergelin et al. |
| D690,583 S | 10/2013 | Sendra-Gonzalez et al. |
| 8,544,230 B2 | 10/2013 | Pervan |
| 8,608,407 B1 | 12/2013 | Vaughn et al. |
| 8,627,862 B2 | 1/2014 | Pervan et al. |
| 8,650,826 B2 | 2/2014 | Pervan et al. |
| 8,677,714 B2 | 3/2014 | Pervan |
| 8,713,886 B2 | 5/2014 | Pervan et al. |
| 8,726,769 B1 | 5/2014 | Jacker |
| 8,733,065 B2 | 5/2014 | Pervan |
| 8,763,341 B2 | 7/2014 | Pervan |
| 8,769,905 B2 | 7/2014 | Pervan et al. |
| 8,826,622 B2 | 9/2014 | Cappelle et al. |
| 8,887,468 B2 | 11/2014 | Hakansson et al. |
| 8,925,274 B2 | 1/2015 | Darko et al. |
| 8,991,055 B2 | 3/2015 | Cappelle |
| 9,145,691 B2 | 9/2015 | Cappelle |
| 9,212,493 B2 | 12/2015 | Cappelle et al. |
| 9,216,541 B2 | 12/2015 | Boo et al. |
| 9,222,267 B2 | 12/2015 | Bergelin et al. |
| 9,238,917 B2 | 1/2016 | Pervan et al. |
| 9,260,870 B2 | 2/2016 | Vermeulen et al. |
| 9,347,469 B2 | 5/2016 | Pervan et al. |
| 9,347,470 B2 | 5/2016 | Maertens et al. |
| 9,366,036 B2 | 6/2016 | Pervan |
| D762,106 S | 7/2016 | Lo et al. |
| 9,388,584 B2 | 7/2016 | Pervan et al. |
| D762,456 S | 8/2016 | Lo et al. |
| 9,428,919 B2 | 8/2016 | Pervan et al. |
| 9,452,514 B2 | 9/2016 | Guthrie et al. |
| 9,458,634 B2 | 10/2016 | Derelov |
| 9,476,208 B2 | 10/2016 | Vermeulen et al. |
| D796,939 S | 9/2017 | Julian |
| 9,751,197 B2 * | 9/2017 | Vandenberg .......... F16B 25/103 |
| 9,822,809 B2 | 11/2017 | Shadwell et al. |
| 9,874,032 B1 | 1/2018 | Chen |
| 9,976,312 B2 | 5/2018 | Boschian |
| D821,853 S | 7/2018 | Mikkelsen |
| D823,672 S | 7/2018 | Mogensen |
| 10,113,306 B2 | 10/2018 | Brigham et al. |
| 10,214,896 B2 | 2/2019 | Tebo |
| D843,806 S | 3/2019 | Brigham |
| D850,897 S | 6/2019 | Vandenberg |
| D850,898 S | 6/2019 | Vandenberg |
| 10,378,218 B2 | 8/2019 | Vandenberg |
| D861,471 S | 10/2019 | Ild |
| 10,494,820 B1 | 12/2019 | Chen |
| 10,605,288 B2 | 3/2020 | Martel et al. |
| D880,285 S | 4/2020 | Olenick |
| D904,861 S | 12/2020 | McWilliams |
| 2003/0019174 A1 | 1/2003 | Bolduc |
| 2003/0121226 A1 | 7/2003 | Bolduc |
| 2003/0154662 A1 | 8/2003 | Bruchu et al. |
| 2003/0235483 A1 | 12/2003 | Chen |
| 2004/0003682 A1 * | 1/2004 | Nanaumi .............. B25B 23/005 |
| | | 81/13 |
| 2004/0045244 A1 | 3/2004 | Hafner |
| 2004/0071505 A1 | 4/2004 | Wisniewski |
| 2004/0141827 A1 | 7/2004 | Dicke |
| 2004/0168382 A1 | 9/2004 | Rudduck et al. |
| 2004/0237460 A1 | 12/2004 | Green |
| 2005/0003160 A1 | 1/2005 | Chen et al. |
| 2005/0072701 A1 * | 4/2005 | Allan ...................... B25H 3/003 |
| | | 206/373 |
| 2005/0257473 A1 | 11/2005 | Shaw et al. |
| 2005/0265806 A1 | 12/2005 | Craven |
| 2005/0278934 A1 | 12/2005 | Orchard |
| 2006/0179757 A1 | 8/2006 | Schulner |
| 2006/0283122 A1 | 12/2006 | Burgess et al. |
| 2007/0128001 A1 | 6/2007 | Su |
| 2007/0196624 A1 | 8/2007 | Chen et al. |
| 2007/0217887 A1 | 9/2007 | Lin |
| 2007/0289249 A1 | 12/2007 | Martel |
| 2008/0025816 A1 | 1/2008 | Chen et al. |

(56) References Cited

U.S. PATENT DOCUMENTS

| | | |
|---|---|---|
| 2008/0080951 A1 | 4/2008 | Lin |
| 2008/0222993 A1 | 9/2008 | Prichard et al. |
| 2008/0240886 A1 | 10/2008 | Martel et al. |
| 2008/0264218 A1 | 10/2008 | Wang et al. |
| 2008/0276761 A1 | 11/2008 | Hale et al. |
| 2008/0279654 A1 | 11/2008 | Deschamps |
| 2008/0296341 A1 | 12/2008 | Francescon |
| 2009/0108719 A1 | 4/2009 | Lilly |
| 2009/0142159 A1 | 6/2009 | Wolpert et al. |
| 2009/0173032 A1 | 7/2009 | Prager et al. |
| 2009/0193741 A1 | 8/2009 | Cappelle |
| 2009/0217495 A1 | 9/2009 | Tipps et al. |
| 2009/0249730 A1 | 10/2009 | Vibiano |
| 2009/0314143 A1 | 12/2009 | Chen |
| 2010/0050556 A1 | 3/2010 | Burns |
| 2010/0083610 A1 | 4/2010 | King |
| 2010/0107524 A1 | 5/2010 | Moss |
| 2010/0257806 A1 | 10/2010 | Snell et al. |
| 2010/0260962 A1 | 10/2010 | Chen et al. |
| 2010/0319290 A1 | 12/2010 | Pervan et al. |
| 2011/0167744 A1 | 7/2011 | Whispell et al. |
| 2011/0167757 A1 | 7/2011 | Vandenberg |
| 2011/0225922 A1 | 9/2011 | Pervan et al. |
| 2011/0232430 A1 | 9/2011 | Hale |
| 2012/0000327 A1 | 1/2012 | Park |
| 2012/0048909 A1 | 3/2012 | Gensmann et al. |
| 2012/0073410 A1 | 3/2012 | Hoffman et al. |
| 2012/0255158 A1 | 10/2012 | Kawasaki |
| 2013/0014465 A1 | 1/2013 | Kilgore et al. |
| 2013/0025230 A1 | 1/2013 | Turner |
| 2013/0051955 A1 | 2/2013 | Su et al. |
| 2013/0104493 A1 | 5/2013 | Orchard |
| 2013/0287484 A1 | 10/2013 | Phillips |
| 2013/0340377 A1 | 12/2013 | Shadwell |
| 2014/0290173 A1 | 10/2014 | Hamberger |
| 2014/0305064 A1 | 10/2014 | Baker et al. |
| 2015/0211558 A1 | 7/2015 | Garrison |
| 2015/0275951 A1 | 10/2015 | Shadwell et al. |
| 2017/0037643 A1 | 2/2017 | Mitchell |
| 2017/0114536 A1 | 4/2017 | Tebo |
| 2017/0138063 A1 | 5/2017 | Boschian |
| 2017/0314278 A1 | 11/2017 | Lee et al. |
| 2017/0321434 A1 | 11/2017 | Shadwell et al. |
| 2017/0362815 A1 | 12/2017 | Brigham et al. |
| 2018/0010627 A1 | 1/2018 | Shadwell |
| 2018/0135673 A1 | 5/2018 | Binkert |
| 2018/0141134 A1 | 5/2018 | Brigham |
| 2018/0238060 A1 | 8/2018 | Doupe et al. |
| 2019/0055738 A1 | 2/2019 | Vandenberg |
| 2019/0055974 A1 | 2/2019 | Vandenberg et al. |

FOREIGN PATENT DOCUMENTS

| | | |
|---|---|---|
| DE | 4228727 A1 | 3/1994 |
| DE | 4331689 A1 | 3/1994 |
| DE | 202014004575 U1 | 8/2014 |
| DE | 202018003385 U1 | 9/2018 |
| EP | 0482363 A1 | 4/1992 |
| EP | 1187993 B1 | 8/2005 |
| EP | 1595627 A2 | 11/2005 |
| EP | 1920890 A2 | 5/2008 |
| EP | 1932623 A1 | 6/2008 |
| EP | 1938928 A1 | 7/2008 |
| EP | 2076362 | 7/2009 |
| EP | 2228504 A2 | 9/2010 |
| EP | 2258518 A2 | 12/2010 |
| EP | 2397706 A1 | 12/2011 |
| EP | 2995744 A2 | 3/2016 |
| EP | 3150083 A1 | 4/2017 |
| FR | 2968366 | 12/2013 |
| GB | 191001226 | 12/1910 |
| GB | 167620 | 8/1921 |
| GB | 1009630 | 11/1965 |
| GB | 2127927 A | 4/1984 |
| JP | 7217625 | 8/1995 |
| JP | 10329049 A | 12/1998 |
| JP | 2000257616 A | 9/2000 |
| JP | 2004308732 A | 11/2004 |
| WO | 1997017505 | 5/1997 |
| WO | 199742420 | 11/1997 |
| WO | 199967541 | 12/1999 |
| WO | 2007091487 A1 | 8/2007 |
| WO | 2015196108 A1 | 12/2015 |

OTHER PUBLICATIONS

Deck Spacers, downloaded from http://www.contractortalk.com/f50/spacers-cleats-simpson-worth-anything-82833/ (viewed Jun. 8, 2017).
Spacer clip, discovered 2017.
Fiberon DeckPilot Mar. 2009.
Fiberon DeckPilot Dec. 2009.
http://www.woodworkersjournal.com/todays-wood-screw-technology-2/ downloaded Feb. 23, 2018.
http://www.starbornindustries.com/cap-tor-xd-product downloaded Feb. 26, 2018.
https://www.strongtie.com/resources/product-installers-guide/sdwc-truss-screw-installation (viewed Jan. 21, 2021).
Images Downloaded from Video at https://www.fastenmaster.com/videos/timberlok-installation-guide-video.html?file (Jan. 21, 2021).
https://fastoolnow.com/simpson-strong-tie-sdwc-guide-truss-stud-guide-for-sdwc-screws/?gclid=CjwKCAjwq_D7BRADEiwAVMDdHq-TA5mBAVKUMaQycRljqcTc4_yGlpMKxnbG86vwYRyl5L1d5TB6RoC_glQAvD_BwE (viewed Jan. 21, 2021).

* cited by examiner

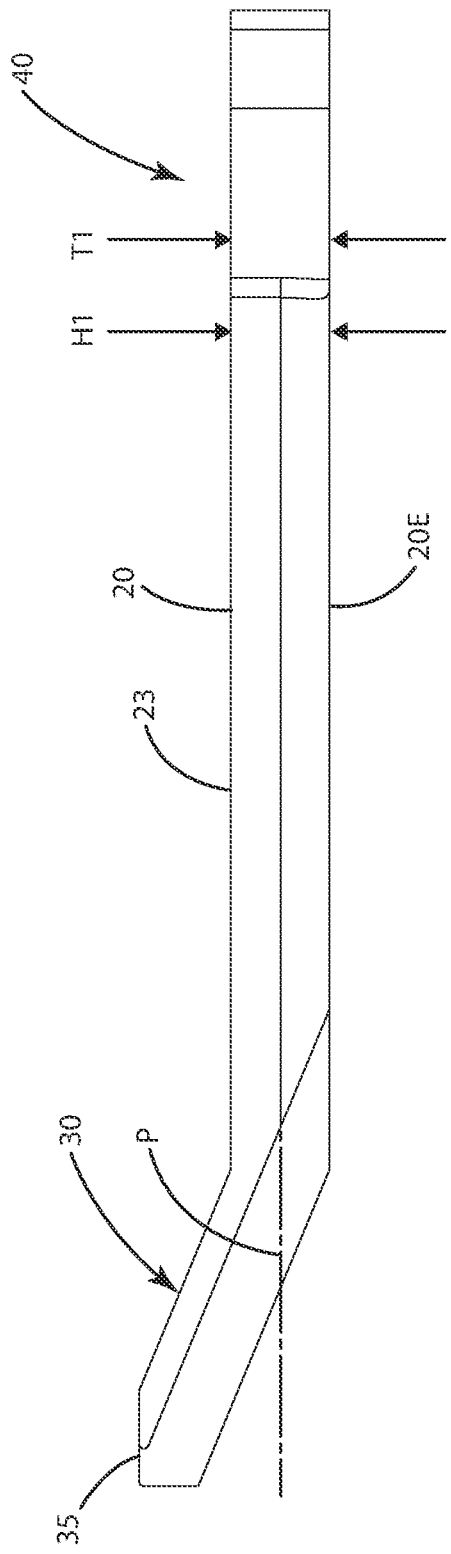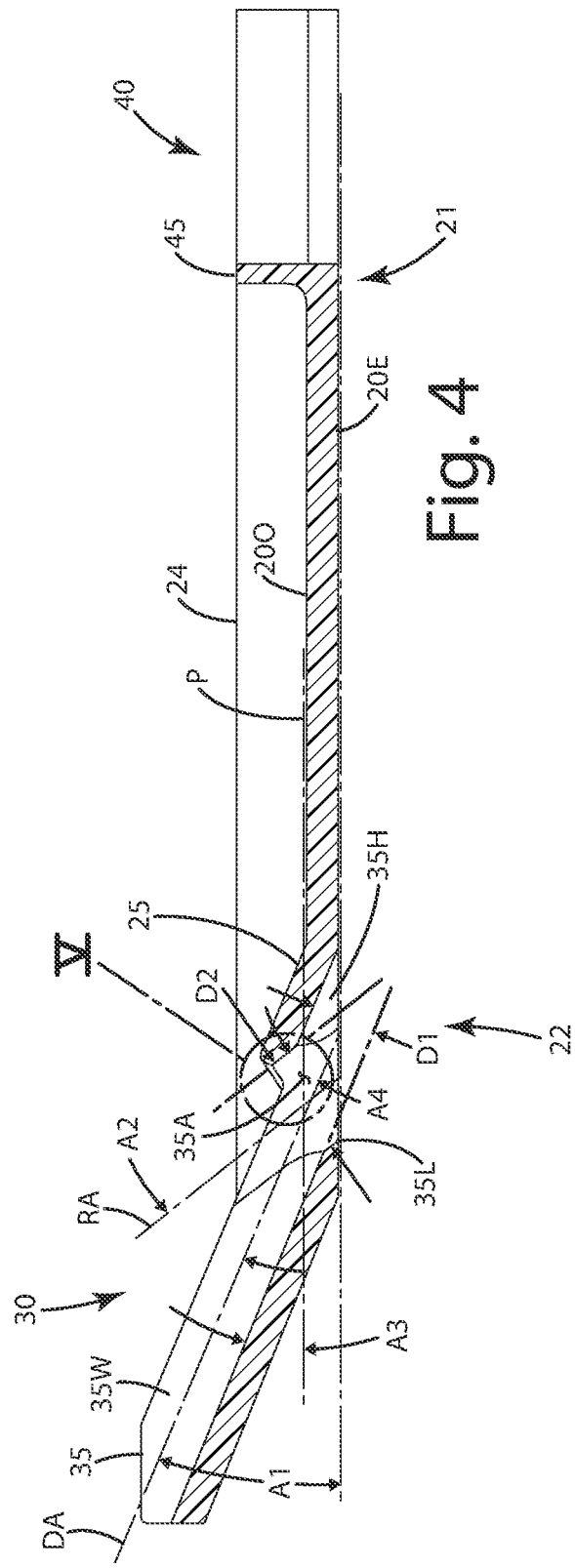

SCREW GUIDE AND RELATED METHOD OF USE

BACKGROUND OF THE INVENTION

The present invention relates to construction tools, and more particularly to a fastener guide to consistently guide a fastener at a particular angle relative to a support board.

There are a variety of fasteners used to connect wood structural members to one another. One type of fastener is a truss screw that is used to secure a top plate of a wall to a roof truss or rafter. The installation of such screws, as well as many others, are regulated by local and state building codes, which present various requirements for securing wooden framing components. These requirements typically mandate that the top plate and the rafter, or roof truss, be connected to comply with specific connection force standards. These standards are selected to resist uplift forces exerted on the structure over its lifetime. Standards in locations with high wind uplift or seismic activity usually prescribe a stronger force-resistant connection between the top plate and rafter or truss.

To meet the building code connection force requirements, installers typically use hurricane straps, metal brackets and/or long screws to reinforce connections at the top corners of walls, where those walls are adjacent roof trusses or rafters. To install long screws at the tops of walls, workers typically stand on a ladder and operate a powered driver to advance the fastener through the top plate and into the truss. Obviously, this maneuver can be difficult and dangerous because the ladder might not offer a stable platform for the installer to operate the drive in the elevated, cramped location. Installation of such long screws is further complicated because those screws usually need to be installed at a particular angle and position to ensure adequate penetration through the top plate and truss. Many times, an installer will need to eyeball the angle and guess at the location so the fastener can be installed properly. This can take a careful and experienced eye, and where there is an error, another fastener may need to be installed. This can consume time and extra fasteners, which can increase labor and material costs.

Accordingly, there remains room for improvement in the field of using threaded fasteners to connect building components in an exact and repeatable manner to meet applicable building codes.

SUMMARY OF THE INVENTION

A fastener guide is provided including a base plate that engages a first board, a guide member that maintains an advancing fastener at a preselected offset angle relative to the first board, and a retainer clip that engages a second board that is transverse to the first board.

In one embodiment, the retainer clip includes first and second prongs that resiliently hold the guide in place as the fastener is advanced at the offset angle, optionally without manual input so that a user can manipulate the fastener and a driving tool instead of holding the guide to align the fastener.

In another embodiment, the retainer clip prongs clampingly engage the second board while the base plate rests adjacent the first board and the guide plate is disposed at the offset angle. The retainer clip temporarily holds the fastener guide to the second board. After installation of the fastener the guide can be easily removed from the board and fastener, so that the guide can be used again to advance another fastener with third and fourth boards.

In still another embodiment, the retainer clip can engage the second board, which can be perpendicular to the first support board. The first prong can include a first prong engagement surface that engages the second support board on a first side of the second support board. The second prong can be distal from and opposing the first prong. The second prong can include a second prong engagement surface configured to engage the second support board on a second side of the second support board.

In yet another embodiment, the second prong engagement surface is spaced a gap width that is less than 1.5" from the first prong engagement surface to form a gap therebetween. The gap width can increase when first and second prongs are urged into engagement with the second support board.

In even another embodiment, the base plate can include a base width. The ratio of the base width to the gap width is less than 1:1 so that the elongated base plate can be visually centered on the first support board. Optionally, the user can view opposing edges of the first board on opposing sides of the base plate and can ensure they are of approximately the same width and size.

In a further embodiment, the offset angle can be between 22° and 158.5°, inclusive, relative to the base plate and/or surface of a board. Optionally, the offset angle can be 22.5°, or some other angle depending on the application and orientation of the first board relative to the second board and/or suitable connecting force for the boards.

In still another embodiment, the guide plate can include an elongated fastener recess, which rotationally constrains the fastener as the fastener is rotated. The fastener recess can partially circumferentiate the fastener, for example, around less than 60% of its circumference, so that the fastener can be easily installed in the recess. The base plate and/or guide plate, however, can include a hump plate that cooperates with the elongated fastener recess to circumferentiate the fastener near the base plate.

In yet a further embodiment, the elongated fastener recess can be in the form of a channel or a trough. The elongated fastener recess can be at the offset angle relative to the base plate. Optionally, the elongated fastener recess can be joined with the base plate and/or guide plate via a pivot so that the channel or trough can be altered, with the offset angle correspondingly being altered. The offset angle can thus be set at any one of a number of preselected angles to advance the fastener into a board at such preselected angle.

In even a further embodiment, the base plate can be or form part of a stop wall of the retainer clip. The guide plate can be one with the base plate. The elongated fastener recess can project from and intersect the stop wall so that a fastener can be advanced through the stop wall and into a board.

In another embodiment, the elongated fastener recess can be a tube that intersects the guide plate and/or the base plate and/or a portion of the retainer clip. The tube in some cases can surround and constrain the fastener as it is advanced. The tube can project upward from the plate at a transverse angle and can include an opening into which the fastener can be fed.

In still another embodiment, the guide can include two or more elongated fastener recesses so that the guide can align two or more fasteners at an offset angle relative to one or more boards. The retainer clip can temporarily retain the guide in position relative to the boards, offering a hands-free operation of the guide while the guide maintains the fastener at a particular offset angle.

In yet another embodiment, the first support board can be a vertical board, for example a side surface of a top plate of a wall and/or a side surface of a vertical stud. The second support board can be a part of a truss, such as a horizontal bottom stringer of a truss. The fastener can be a screw having multiple threads from head to tip, and a fastener length of at least 4". The fastener can connect the truss to the top plate and the wall with which it is formed, optionally to resist uplift forces on the truss when included in a roof system.

In even another embodiment, the first support board can be a part of a baluster and the second board can be a board to which the baluster is secured. The guide can guide the fastener at some offset angle relative to the baluster, optionally at an end thereof, and through a baluster side, and out a baluster end surface into a support board to which the baluster is secured.

In a further embodiment, a method is provided. The method can include: engaging an elongated base with a first support board along a length of the elongated base plate, the elongated base plate including a longitudinal axis; pushing a retainer clip joined with the elongated base until a stop wall engages a second support board that is perpendicular to the first support board; temporarily holding the guide in place in a fixed position relative to the first support board and the second support board with the retainer clip, and without manual input to hold the guide; advancing a fastener in an elongated fastener recess of a guide joined with the base, the guide rotationally constraining a fastener rotating therein as the fastener advances into the first support board so as to advance the fastener at the offset angle relative to the first support board and into the second support board to thereby secure the first support board to the second support board with the fastener.

In still a further embodiment, the method can include using a retainer clip where the first prong includes a first prong ramp that guides the first prong onto the second support board during the pushing, and the second prong includes a second prong ramp that simultaneously guides the second prong onto the second support board during the pushing. The first prong and the second prong resiliently deflect from the board and spread apart from one another during the pushing.

In yet a further embodiment, the first prong and the second prong can be spaced a gap width that is less than 1.5" before said pushing. The first prong and second prong can spread apart from one another so that the gap width is equal to or greater than 1.5" as the base slides along the first support board, and as the second support board enters the retainer clip. Optionally, after the fastener is installed, the retainer clip can be removed from the second board and the guide can be moved distal from the first board.

The current embodiments provide an apparatus and method for efficient and consistent installation of a fastener at an offset angle relative to first and second boards to secure those boards with a secure connection. Where the retainer clip temporarily secures the guide to the second board, this can allow the user hands-free operation of the fastener and the driving tool, while the fastener guide maintains the offset angle of the screw for advancing into the board. The resilient prongs of the retainer clip also can allow the clip to be quickly and easily removed after the fastener guide serves its purpose to align the fastener at the preselected angle. Then, the guide can be efficiently moved to another set of boards to install another fastener and connect those boards at the offset angle. Where the fastener recess is adjustable in angle, the fastener guide can be used in a variety of applications to install fasteners at different angles suitable to the application.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 3 is a side view of the fastener guide;

FIG. 4 is a side section view of the fastener guide;

DETAILED DESCRIPTION OF THE CURRENT EMBODIMENTS

A current embodiment of the fastener guide is shown in FIGS. 1-8 and generally designated 10. Alternative embodiments are shown in FIGS. 9-20. The embodiments of the fastener guide are well suited for a variety of building and construction projects, such as commercial, residential and other construction projects. The fastener guides, however, can be modified for use in other applications, such as automotive, marine, industrial, and/or consumer products. As described herein, the fastener guides can be used in the application of a fastener 100 at a particular offset angle A1 through a first support board 101 and into a second support board 102 (FIGS. 7-8), transverse to the first board, to connect those boards to one another with the fastener. The boards can be constructed from wood, plastic, composites, metal, ceramic, tile, masonry or other materials depending on the application.

Figure 5:
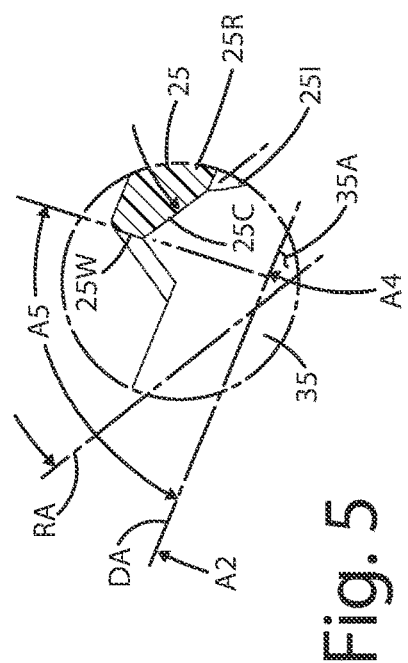
FIG. 5 is a close up view of a fastener aperture and fastener recess of the fastener guide.
Figure 6:
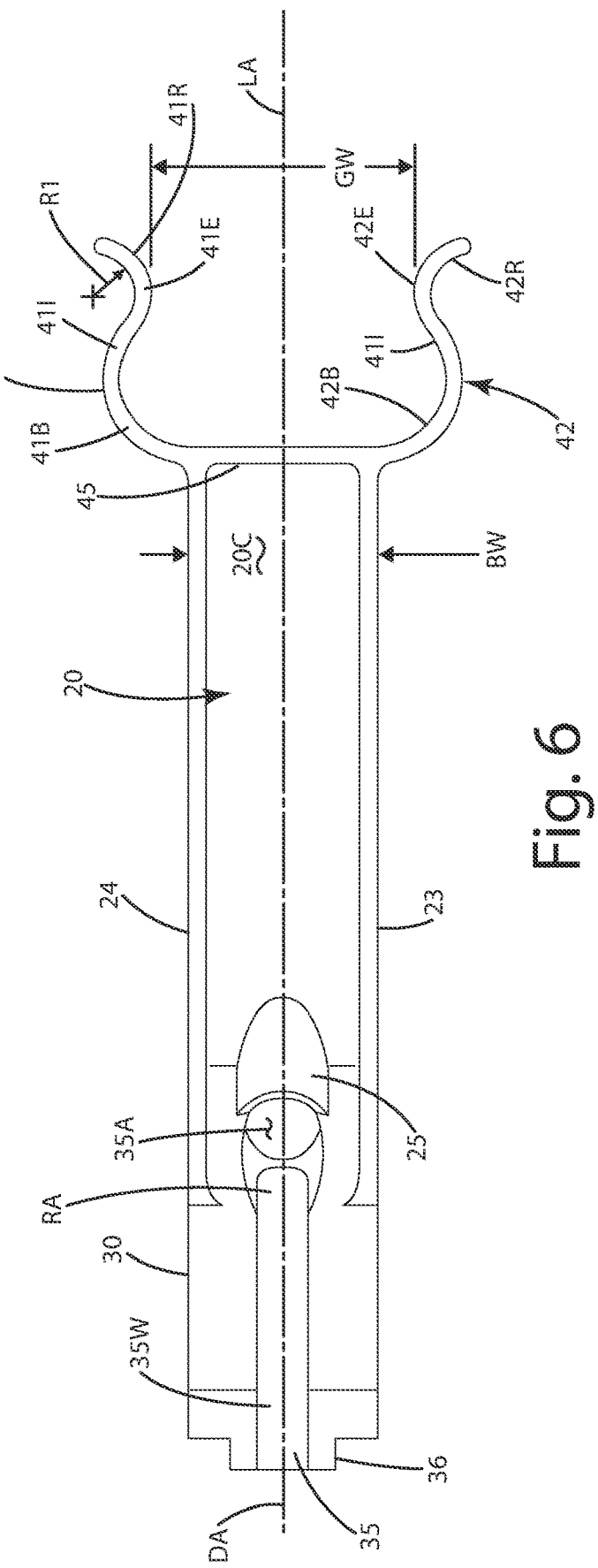
FIG. 6 is a top view of the fastener guide.
Figure 7:
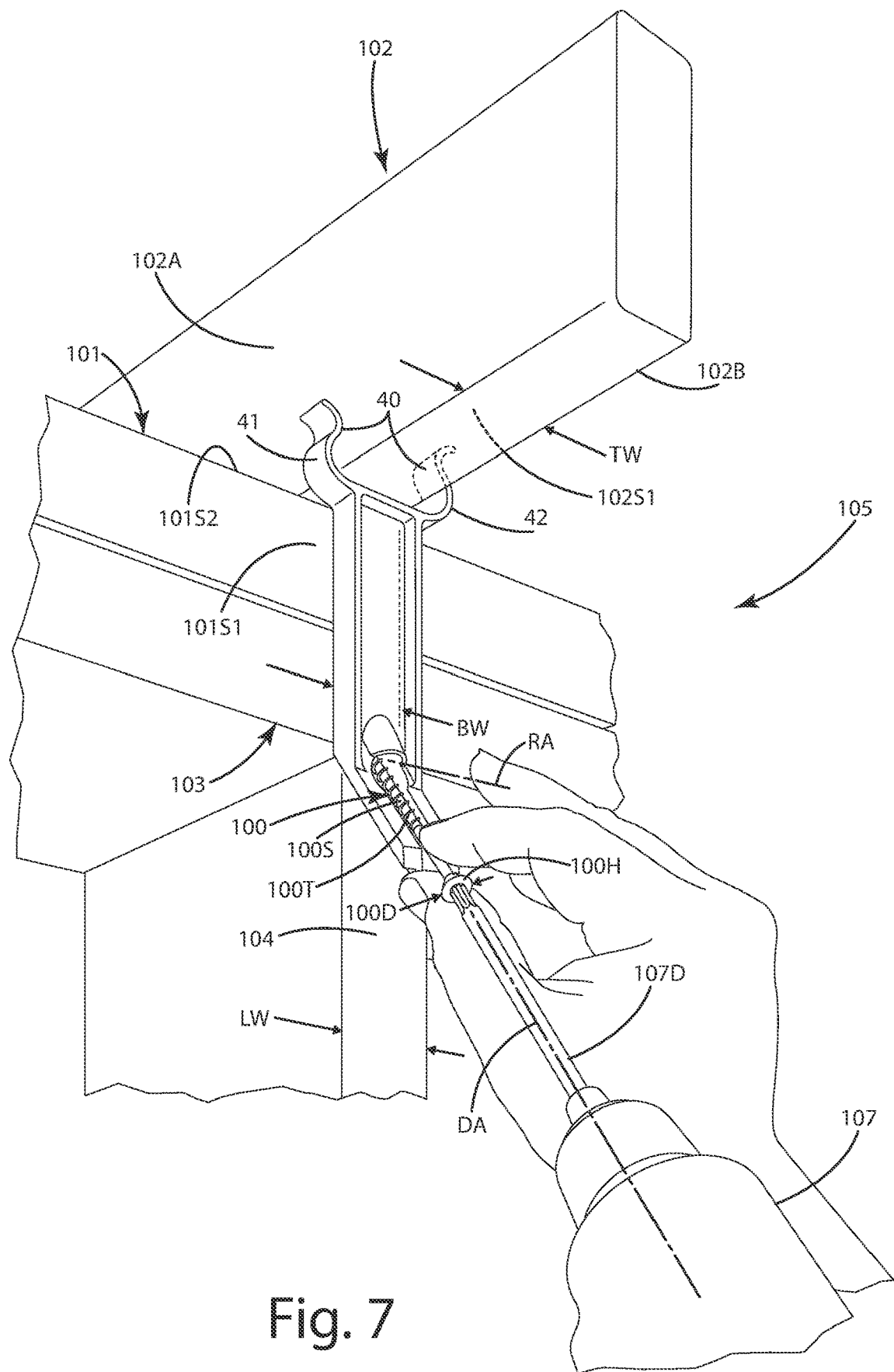
FIG. 7 is a view of a retainer clip of the fastener guide temporarily clamping a second support board while a fastener is advanced initially in a first support board.
Figure 8:
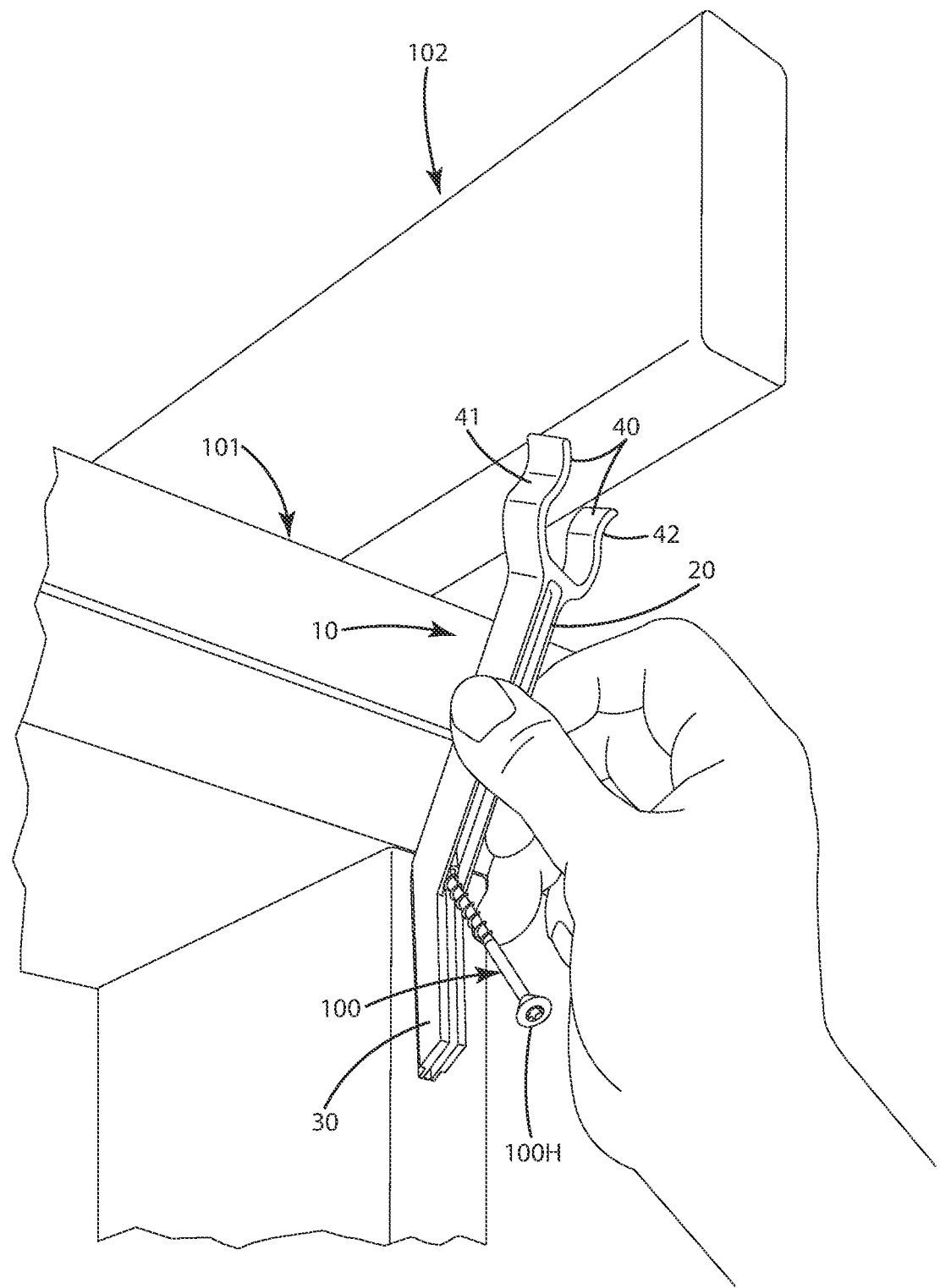
FIG. 8 is a view of the fastener clip of the fastener guide removed from the second board and the guide being removed from a partially advanced fastener.

In the embodiment of FIGS. 1-8, the support boards 101 and 102 optionally can be a top plate 101 and a stringer 102 for a roof truss or rafter. These support boards, with which the fastener guide is used, can be framing elements, such as wooden boards, that are disposed transverse to one another. As shown, the first board 101 can be offset and perpendicular to the second board 102. Optionally, the entire wall 105 of multiple first boards can be perpendicular to the set of second boards, which can be a set of trusses that make up a roof structure for a building. Of course, other types of transversely oriented boards can be joined using the fastener guide as well as described in the embodiments below. As shown in FIG. 7, the first board or top plate 101 can rest on a second plate 103, which rests atop multiple studs 104. The second support board or stringer can be part of a truss. The first board 101 can include a first surface 101S1 which can be a vertical surface, and a second surface 101S2, which can be an upper horizontal surface of the board 101. The second board 102 can include a first surface 102S1 that faces and optionally engages the second surface 101S2. The first surface 102S1 can be perpendicular to the first surface 102S1 and the second surface 101S2. When installed or advanced, the fastener 100 can penetrate and/or extend through the first surface 101S1, second surface 101S2 and first surface 102S1 to connect the first board 101 to the second board 102. Where included, the fastener also can penetrate and/or extend through the third board 103 and in some cases the fourth board 104.

The fastener as shown can include a head 100H, a shaft 100S with a thread 101T that extends around the shaft from head to tip of the fastener. Optionally, the fastener can be a threaded screw that advances via rotation by a drive tool 107 as described below. The fastener can have a length of optionally at least 3", at least 4", at least 5", at least 6", at least 7", at least 8", at least 9" or more, depending on the application and the thickness of the boards that it connects. The head 100H can include a diameter 100D that is greater than a diameter D1 of an elongated fastener recess 35 of a guide plate 30 of the fastener guide 10 as described below. In some cases, of the diameter 100D can be less than or equal to the diameter D1. The head 100H also can be less than a diameter D2 of the feed or removal aperture 35A that is in communication with the elongated recess 35, such that the fastener guide 10 can be pulled or removed relative to the fastener via the head 100H passing through the aperture 35A.

With reference to FIGS. 1-6, the features and structure of the fastener guide will now be described in more detail. The fastener guide can generally include an elongated base plate 20, a guide plate 30 (which need not necessarily be in plate form), and a retainer clip 40. The base plate 20 can include a first end 21 and a second end 22, an engagement surface 20E and an outer surface 20O. The base engagement surface can be configured to engage the first support board 101 along a length L (not necessarily the entire length) of the elongated base plate 20. The elongated base plate 20 can include a longitudinal axis LA, which can extend through the retainer clip 40 and the guide plate 30 as well. The base plate can be optionally planar, like a plate, or can be thick and more similar to a block or bar in some embodiments. The base plate 20 can include a base width BW that is transverse to the longitudinal axis LA of the plate 20. This base width can be optionally less than 2", less than 1.5" or less than 1". Further optionally, the base width BW can be less than a width LW of a vertical board 104 over which part of the fastener guide 10 projects when installing a fastener. This can allow a user to see opposing parts or edges of the board on opposite sides of the width and thus to try and make those parts equal to center the fastener placement or otherwise get a feel for the fastener guide being generally in a vertical orientation.

The base plate 20 can include a first support wall 23 extending away from the first end 21 and the retainer clip 40 or an optional stop wall 45 thereof, toward the second end 22 of guide plate 30. The first support wall 23 can extend upward from the elongated base plate on a first side of the longitudinal axis LA. The height H1 can be equal to or slightly less than the height H2 of the stop wall 45. The base plate 20 can include a second support wall 24 opposite the first support wall 23. The first wall 23, second wall 24 and stop wall 45 can form a channel or recess 20C above or in the base plate between the first end and the second end. The second support wall 24 can extend away from the first end 21 and the stop wall 45, toward the second end 22 and guide plate 30, optionally parallel to the first support wall 23. The second support wall 24 can extend upward from the elongated base plate 20 on a second side of the longitudinal axis LA, opposite the first wall. The height H1 can be equal to or slightly less than the height H2 of the stop wall 45.

Optionally, the base plate 20 can include a hump wall 25 that extends upward from the outer surface 20O, as shown in FIGS. 1-5. The hump wall 25 can cooperate with the guide plate 30 and the elongated fastener recess 35 to circumferentiate the fastener 100 as the fastener is advanced, and/or to cooperatively, rotationally constrain the fastener 100 as it rotates and advances along an advancement or drive axis DA. With this circumferentiating of the fastener, the guide optionally can be removed from a fastener that is partially installed by moving the screw or guide relative to one another parallel to or along the drive axis or removal axis as described below. The hump wall 25 include an upward angled ramp 25R as shown in FIGS. 4-5. The upward angled ramp 25R can be angled similarly to an offset angle A1 at which the fastener is theoretically advanced into the board. The upward angle ramp can include a taper or partially conical or angled section 25C that can interface with the head 100H of the fastener and help guide the fastener past the hump through the hole 35H defined on the engagement surface 20E of the base 20. The conical or angled section 25C can be angled at an angle A4 relative to the drive axis DA, as well as the inner surface 251 of the hump wall that can directly engage the fastener as it rotates. The angel A4 can be an acute angle, and can be optionally between 5° and 45°, inclusive, between 10° and 25°, inclusive, 10°, 20°, 30°, 40°, or other angles. The inner surface 251 can be optionally parallel to the drive axis DA in some cases. The hole 35H can be an elongated hole, optionally in the form of an ellipse or elongated polygon in some cases when viewed from the engagement surface 20E. Further optionally, the ramp 25R can transition to an outer rim 25W of the hump wall. This outer rim can be disposed and another angle A5 relative to the drive axis. This angle A5 can be optionally perpendicular to the axis DA, or at some other angle to facilitate removal of the guide 10 from the fastener.

The hump wall 25 and wall 25C can cooperate with a portion 35L of the guide wall 35 of the guide as described below to form a feed aperture or a removal aperture 35A having the diameter D2. This diameter D2 can be larger than the diameter 100D of the head of the fastener 100 so the guide can be removed from the fastener after the fastener is partially or fully installed as described below. The removal aperture 35A also can include a removal axis RA at which the fastener 100 can be while the fastener guide 10 is removed from the fastener 100. This removal axis RA can be offset at an angle A2 relative to the drive axis DA of the fastener recess 35. This angle A2 can be optionally at least 10°, at least 20°, at least 30° or between 1° and 45°, depending on the application and removal angle or size of the fastener and its head.

As shown in FIGS. 1-5, the fastener guide 10 can include the guide plate 30 as mentioned above. The guide plate 30 can be joined with the base plate 20 at the second end 22, distal from the retainer clip 40. The guide plate can be disposed at an offset angle A3 and extending transversely above a plane P of the outer surface 20O of the base plate. This offset angle can optionally be equal to the angle A1 at which the drive axis DA of the fastener is disposed relative to the engagement surface 20E and/or generally a surface of the first board 101. The guide plate 30 can include a guide wall 35W forming an elongated fastener recess 35 that intersects the plane P and that is configured to rotationally constrain the fastener 100 rotating therein as the fastener advances along the drive axis DA and into the first support board. As a result, this advances the fastener 100 at the offset angle A1 relative to the first support board 101. This the offset angle A1 can be between 22° and 158°, inclusive, between 22.5° and 158.5°, inclusive, between 22° and 145°, inclusive, between 23° and 120°, inclusive, 23°, 45°, 90°, 120°, or other angles relative to the base plate and/or surface of a board. Optionally, the offset angle can be 23°, or some other angle depending on the application and orientation of the first board relative to the second board and/or suitable connecting force for the boards.

Figure 1:
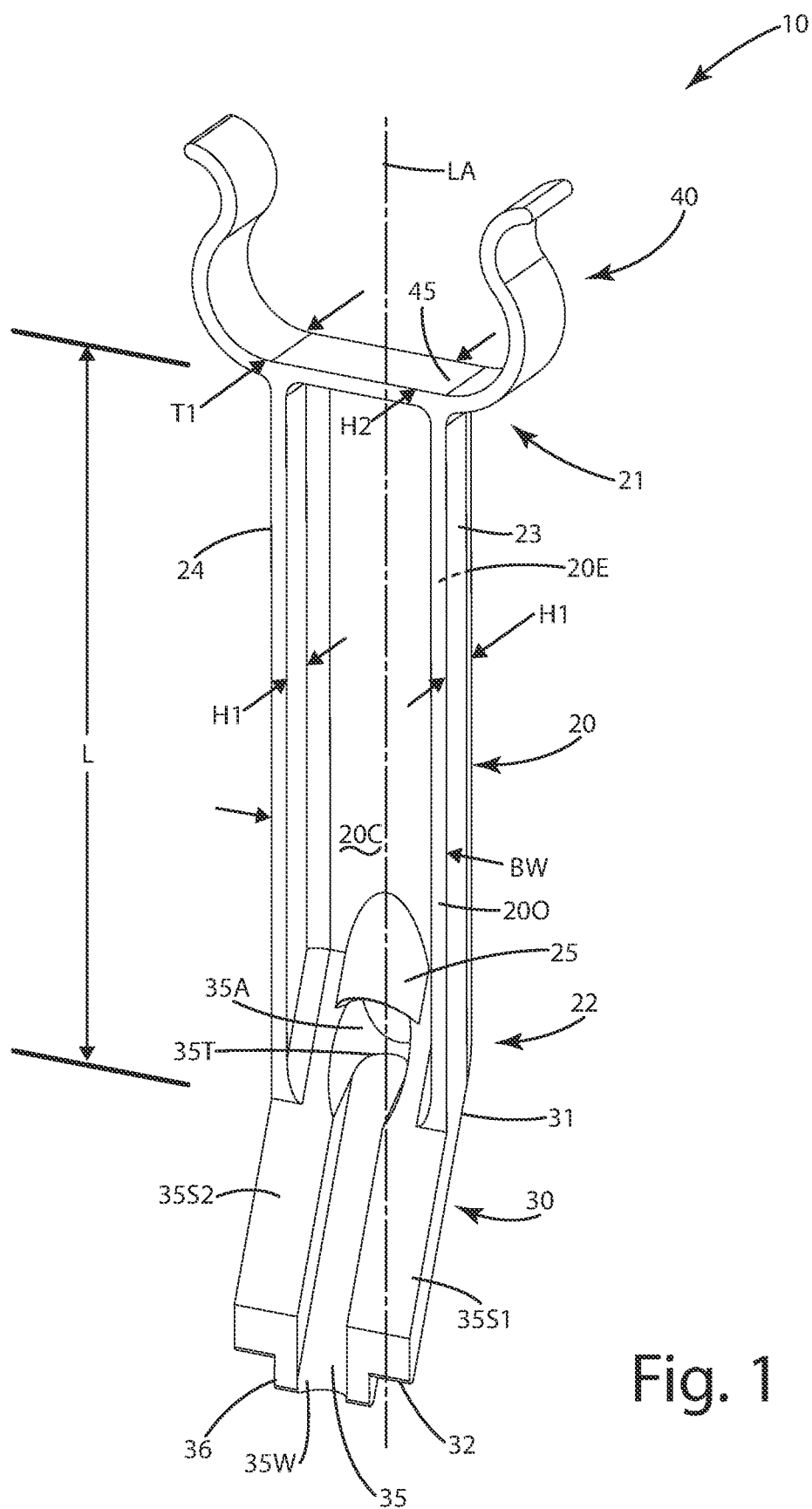
FIG. 1 is an upper perspective view of the fastener guide of a current embodiment.
Figure 2:
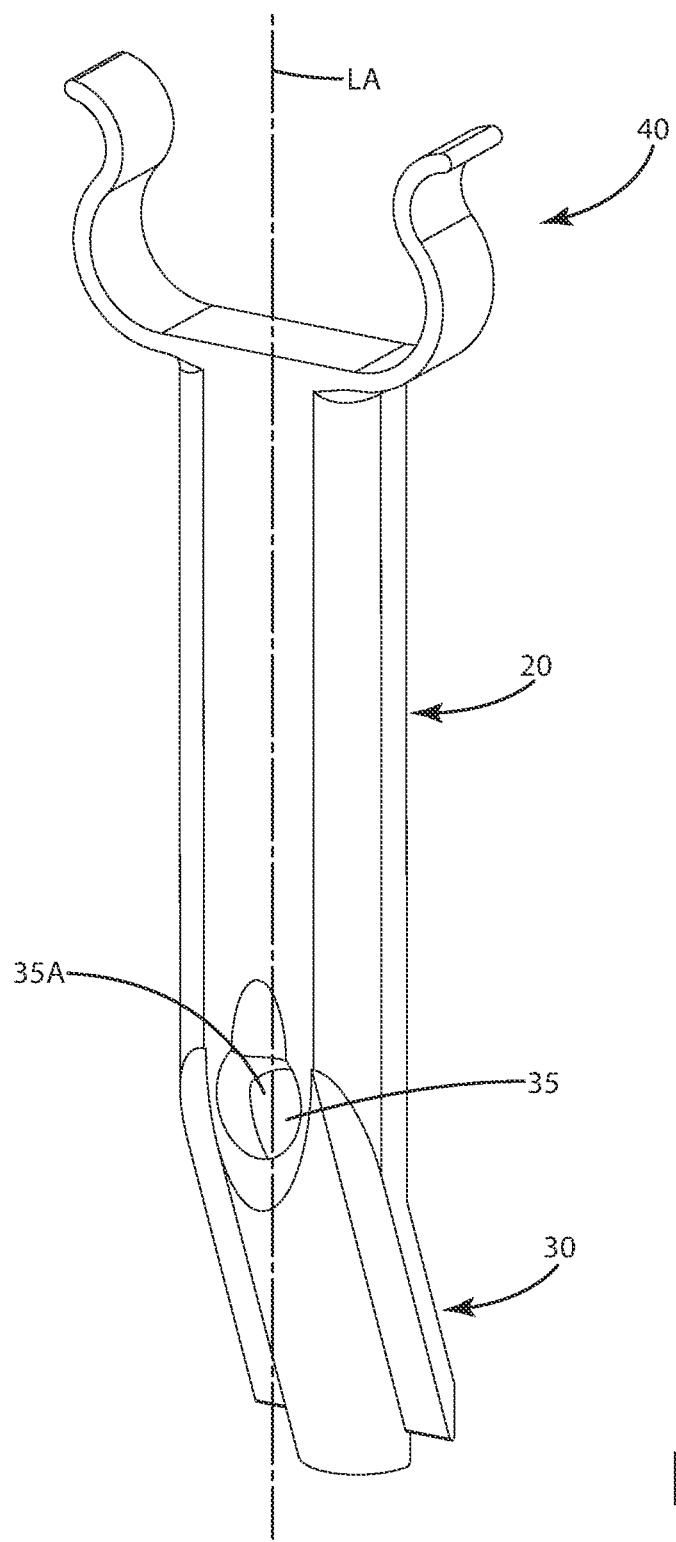
FIG. 2 is a lower perspective view of the fastener guide.

As shown in FIG. 1, the guide wall 35 can extend along the guide plate 30 generally between a first shoulder 35S1 and a second shoulder 35S2. The shoulders can extend toward the first end 31 of the guide plate. The first and second support walls 23 and 24 optionally can be configured such that the support walls extend along the shoulders for a portion thereof. The elongated fastener recess 35 can include an extension portion 36 that extends outward from the second end 32 of the guide plate. This portion 36 can include the guide wall 35W of the elongated recess. The guide wall 35W of the recess 35 can form a partially circular channel that extends from the first end to the second end. The channel can feed into the hole 35H defined by the base plate and/or guide plate. This channel optionally can be configured so it is not completely circumferentiate the fastener when the fastener is advanced along the drive axis DA. In some cases, however, the recess 35 can be configured so the guide wall 35W forms a tube around the drive axis DA as described in the embodiments below. Whether or not the fastener recess is in the form of an open channel or a completely closed tube, it still can be referred to herein as an elongated fastener recess.

The elongated fastener recess 35 and its associated guide wall 35W can intersect the feed aperture or removal aperture 35A. The elongated fastener recess can be in communication with the feed aperture or the removal aperture so that the fastener can be fed from the recess 35 into the board, and/or the fastener guide can be removed from the fastener with the guide being removed so that it exits the guide through the removal or feed aperture 35A and/or the hole 35H, which can also be referred to as a feed aperture because the fastener can feed through that aperture. As described above, the drive axis DA can be centered in the guide wall 35W and the elongated fastener recess 35. The removal axis RA can be centered in the removal aperture 35A. Where the removal aperture 35A and guide wall 35W intersect, the two elements can form a transition region 35T. This transition region can be disposed between the hump wall of the base plate 20 and the shoulders 35S1 and 35S2 of the guide plate 30.

With reference to FIGS. 1-8, the retainer clip 40 can be joined with the first end 21 of the base plate 20 distal from the guide plate 30. The retainer clip can include a stop wall 45 that optionally can be perpendicular to the longitudinal axis LA. The stop wall can be configured to engage the second support board 102, and optionally the surface 102S1 that can be transverse to the surface 101S1 of the first board, for example, perpendicular to the first support board when the fastener guide is installed. The retainer clip 40 can include first 41 and second 42 prongs extending away from the base plate and/or the stop wall. The prongs optionally can be an extension of the stop wall, and can be of a similar or uniform width, thickness and/or height as the stop wall as shown. Further optionally, the base plate and its components can be of a height that is equal to or less than the thickness T1 of the retainer clip. The plate thus can maintain a low profile relative to the board when placed adjacent it.

The first prong 41 can be located across the longitudinal axis LA from the second prong as shown in FIG. 6. The first prong 41 can extend in a first direction away from the stop wall on a first side of the longitudinal axis LA. The prong 41 can include a prong base 41B that extends in this direction away from the axis LA. The prong base 41B can transition to an inward part 41I, which is inwardly directed toward the longitudinal axis. That part 41I can transition to a first prong engagement surface 41E. This surface 41E can be flat, rounded and/or angled. Generally, this surface 41E can be configured to engage the second support board on a first side 102A of the second support board 102, optionally while the base engagement surface engages the first support board 101 along the length. The first prong 41, as well as the first prong engagement surface 41E can be resiliently biased toward the longitudinal axis LA. Optionally, the first prong 41 can further include a first prong ramp 41R that is configured to guide the first prong 41 onto the second support board. This ramp 41R can transition away from the engagement surface 41E, and away from the longitudinal axis LA as it extends farther from the stop wall and base. The ramp 41R can include a radius R1 and can extend outward from the first prong engagement surface. With a first round contour, the ramp can be convexly oriented relative to the longitudinal axis. The ramp can be at least partially rounded or alternatively angled. With this rounded or angled surface, the ramp can facilitate a sliding action of the first prong relative to a first side surface 102A of the support board 102 about which the retainer clip is placed to secure the guide 10 to that support board 102.

The retainer clip 40 can include a second prong 42, distal from and opposing the first prong 41. The second prong 42 can extend in a second direction away from the stop wall on a second opposing side of the longitudinal axis LA. Generally, the second prong can be opposed to and facing toward the first prong. The second prong 42 can include a second prong base 42B that extends away from the axis LA and away from the opposing first prong base 41B. The prong base 42B can transition to an inward part 42I, which is inwardly directed toward the longitudinal axis. That part 42I can transition to a second prong engagement surface 42E. This surface 42E can be flat, rounded and/or angled. Generally, this surface 42E can be configured to engage the second support board on a second side 102B thereof, optionally while the base engagement surface engages the first support board 101 along the length, and optionally while the first prong engages the first surface 102A of the second support board 102. The second prong 42 and the second prong engagement surface 42E can be resiliently biased toward the longitudinal axis LA. Optionally, the second prong 42 can further include a second prong ramp 42R that is opposite the first prong ramp 41R. The second ramp can cooperate with the first ramp to guide the second prong 42 onto the second support board, optionally as the first ramp is guided on as well. The second ramp 42R can transition away from the engagement surface 42E, and away from the longitudinal axis LA as it extends farther from the stop wall and base. The ramp 42R can include a radius similar to radius R1 and can extend outward from the second prong engagement surface. With a second round contour, the ramp can be convexly oriented relative to the longitudinal axis as shown. The ramp 42R can be at least partially rounded or alternatively angled. With this rounded or angled surface, the ramp 42R can facilitate a sliding action of the second prong relative to a second side surface 102B, which is opposite the first side surface, of the support board 102 about which the retainer clip is placed to secure the guide 10 to that support board 102.

The first and second prongs, and the retainer clip in general, can be configured to temporarily clamp the guide 10 to second support board 102 in a hands-free manner as the fastener advances into the first and second support boards. A hands-free manner can mean where the guide is self-suspended by the retainer clip on the second board, such that if the user desires, the user need not constantly hold the fastener guide after the clip is installed on the second board to maintain the fastener guide adjacent the first and/or second board, optionally when the fastener is placed in the fastener recess or when the fastener is advanced. Optionally, the prongs can be spaced and oriented relative to one another to clampingly engage the second board and its respective side surfaces. The second prong engagement surface 42E can be spaced a gap width GW from the first prong engagement surface 41E to form a gap therebetween. The gap width can be optionally less than 6", less than 3.5", less than 1.5", less than 1.25", or some other measurement, depending on the application. The gap width GW can increase to a greater width when the first ramp and the second ramp are urged into engagement with the second support board, thereby spreading the prongs apart from one another. Optionally, the gap width can increase from being less than 1.5" to being equal to or greater than 1.5". Of course, when the guide 10 and clip 40 is removed from the board, the gap width can decrease again, with the first and second prongs again resiliently rebounding back toward the longitudinal axis LA of the guide 10. Optionally, the gap width GW can be established in a ratio relative to the base width BW and/or a width TW of the board 102. For example, the ratio of the base width BW or the board width TW to the gap width GW can be optionally less than 1:1 or less than 1:1.5. This can be such that the prongs are resiliently bent or folded or moved enough so that the retainer clip will satisfactorily clamp the second board and hold the fastener guide 10 to the board. Further optionally, the retainer clip 40 clampingly secures the elongated base plate and guide plate in a fixed orientation relative to the first support board and second support board as the fastener advances into the first support board so that a user need not manually engage the guide and hold the guide as the fastener advances into the first support board, at least for part of the advancement.

A method of using the fastener guide 10 will now be described with reference to FIGS. 1, 4, 7 and 8. The method optionally can include engaging the elongated base 10 with a first support board along a length of the elongated base plate 10; pushing the retainer clip 40 joined with the elongated base until the stop wall 45 engages the second support board 102 that is transverse to the first support board 101; temporarily holding the guide 10 in place in a fixed position relative to the first support board 101 and the second support board 102 with the retainer clip 40; advancing the fastener 100 in an elongated fastener recess 35 of the guide 30, the guide 30 rotationally constraining the fastener rotating therein as the fastener advances into the first support board 101 so as to advance the fastener at the offset angle A1 relative to the first support board 101 and into the second support board 102 to thereby secure the first support board to the second support board with the fastener.

More particularly, the fastener guide 10 can be used to install a fastener relative to the first board and second board, as well as other boards in some cases. Optionally the method can include, with reference to FIG. 7, pushing or moving the fastener guide 10 adjacent a first board 101, and in direct contact with the first board surface 101S1. To do so, the user can manually slide the base 20 along the first board, aligning the retaining clip 40 with the second board. In so doing, the user can align the base and guide plate 30 with the fourth board 104. The fastener guide 10 can be moved upward such that first prong 41 engages the first side surface 102A. The first prong ramp 41R can engage the first surface 102A of the board 102 as the guide is moved toward the board. Likewise, the second prong 42 can engage the second side surface 102B. The second prong ramp 42R can engage the second surface 102A of the board as the guide is moved toward the board 102. The two opposing first and second ramps 41R and 42R can slide over the corners and edges of the board, and in so doing can cause the prongs to spread apart from one another.

Optionally, as the prongs and ramps engage the respective side surfaces, the gap width GW can increase. For example, the first prong and the second prong can be spaced a gap width that is less than 1.5" before movement of the retainer clip onto the second board. As the movement commences and continues, the first prong and second prong can spread apart from one another so that the gap width is equal to or greater than 1.5" as the base slides along the first support board, and as the second support board enters the retainer clip. Of course, in other applications, the gap width can be of a different value but can still increase as the first and second prongs resiliently bend and flex or move away from one another and/or the longitudinal axis LA of the faster guide as the retainer clip is placed on the second board 102. After this placement, and spreading of the prongs, the retainer clip, and its respective prongs are urged or biased toward one another and toward the longitudinal axis. As a result, the retainer clip clampingly engages the second support board that is transverse to the first support board. Thus, the fastener guide 10 can be secured to the second support board, and optionally suspended there without further manual forces being exerted on the faster guide. Of course, if a user desires to continue to hold a fastener guide, they can do so.

With the fastener guide secured to the second support board 102 via the retainer clip, the user can insert a fastener 100 into the elongated recess 35. The user will insert the tip of the fastener so that it extends through the recess and under the hump wall 25, further through the feed aperture 35A and the hole 35H until the tip touches the side surface 101S1 of the first support board 101 (or of the board 103, which also can be a first support board). The fastener 100 and in particular its shaft can be aligned along the drive axis DA of the guide plate 30 when so installed. The shaft and the respective threads of the fastener can engage and contact the guide wall 35W. As this occurs, the fastener can be oriented at the angle A1, which optionally can be about 22° or 23° in the application shown, where the second support board is a truss and the first support board(s) are plates. In effect, the fastener guide 10, with its elongated fastener recess, precisely holds the fastener at this angle A1. Further, the angled ramp 25R as well as the hump wall 25 can prevent or impair the tip of the screw from tipping out of engagement with the surface of the board.

The user can hold the fastener 100 in this position, and optionally can engage the fastener guide with that same hand. The user can use an alternate hand to engage a drive tool 107 with the head 100H of the fastener 100. The user can use the drive tool to rotate the fastener while it is rotationally constrained within the elongated fastener recess 35. As the driving tool advances the fastener 100, with reference to FIG. 7, the fastener rotates within the elongated axis LA. The tip penetrates the surface of the first board 101. As a result, the threads 100T of the fastener 100 advance the fastener into the first board 101. The fastener 100 continues to rotate about the drive axis DA and continues to advance along the axis. The head 100H draws near to the guide plate 30, in particular the recess. When the head 100H of the fastener 100 nears or engages the extended part 36 of the guide plate 30, the user can cease advancement of the fastener by ceasing rotation of the fastener with the drive tool.

At this point, the user can grasp the fastener guide 10 and pull the guide downward. As this occurs, the retainer clip, and the engagement surfaces of the prongs slide along the opposing surfaces of the second support board until the retainer clip releases or disengages the support board 102. When this occurs, the first and second prongs are urged toward one another, due to their resiliency and having been previously spread apart, and the longitudinal axis LA of the fastener guide.

With the retainer clip and guide in general disengaged from the second support board 102, the user can tip the fastener guide 10 away from the first board 101 such that a longitudinal axis of the fastener, now stationary and partially installed in the first board, generally aligns with the removal axis RA as shown in FIG. 4. With this alignment, the user can slide the fastener guide along the fastener shaft until the head 100H exits through the removal aperture 35A. The user can then move the fastener guide 10 to another location to install another fastener into another first board and a second board. The user can repeat the fastener installation process multiple times using the same reusable fastener guide, with its retainer clip that temporarily holds the fastener guide adjacent a particular board, aligns a fastener at a particular offset angle, and allows the user to advance that fastener along that offset angle in a precise and consistent manner.

In a slight modification of the above steps, optionally, when the head 100H of the fastener 100 nears or engages the extended part 36 of the guide plate 30, the user can continue advancement of the fastener until the head 100H engages the board. In such a case, the bit of the driving tool can be elongated so that it can enter and pass within and through the fastener recess. After installation of the fastener fully into the board, the driving tool and bit can be moved away from the fastener and the guide removed from the second board as noted above.

Figure 9:
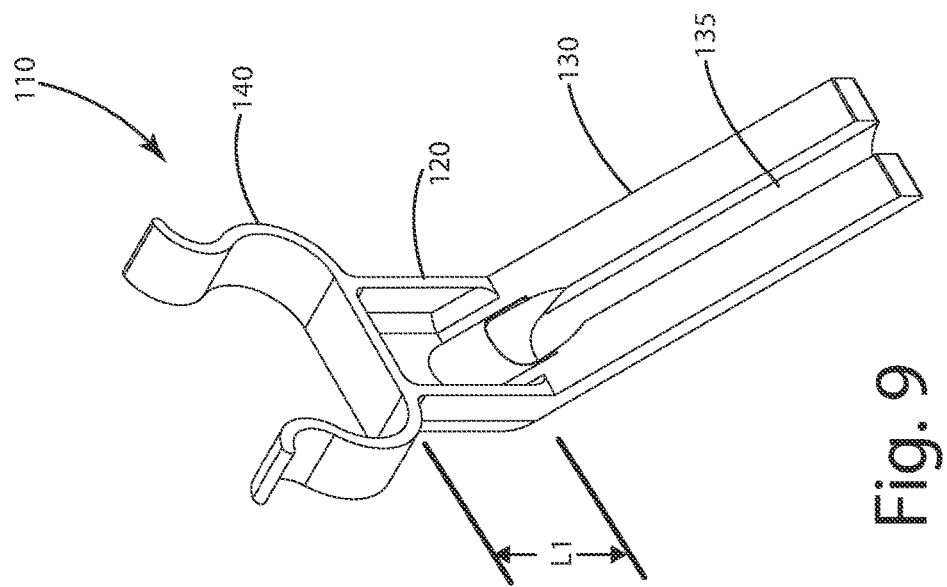
FIG. 9 is an upper perspective view of a first alternative embodiment of the fastener guide.

A first alternative embodiment of the fastener guide is illustrated in FIG. 9 and generally designated 110. The fastener guide of this embodiment is similar in structure, function and operation to the embodiment described above with several exceptions. For example, this guide 110 can include a base plate 120 that is joined with a guide plate 130 defining an elongated fastener recess 135. The base plate 120 can be joined with the retainer clip 140. All these components can be similar to same components mentioned above, however the base plate 120 can have a short length L1, which is substantially shorter than the length L of the base plate 20 in the embodiment above. For example, the base plate 20 length L can be optionally at least 1.5", at least 3", at least 6", or greater lengths. The length L1, however can be less than the length L, being less than or equal to about 1.5". With this shorter length L1, the fastener guide 110 can be used to install a fastener directly in an uppermost top plate of a wall, or other framing structures ending on the application.

Figure 10:
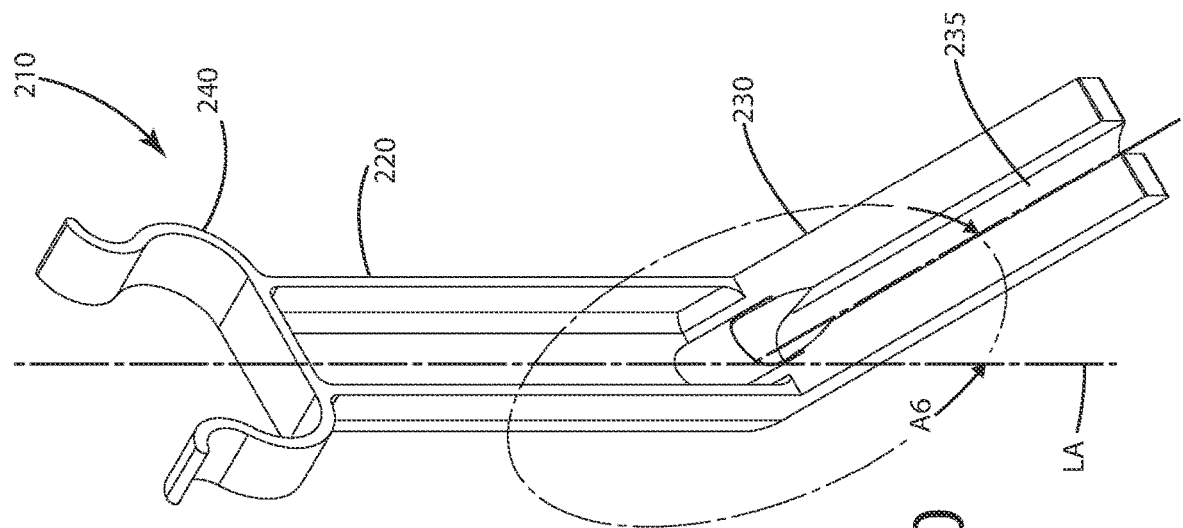
FIG. 10 is an upper perspective view of a second alternative embodiment of the fastener guide.

A second alternative embodiment of the fastener guide is illustrated in FIG. 10 and generally designated 210. The fastener guide of this embodiment is similar in structure, function and operation to the embodiments described above with several exceptions. For example, this guide 210 can include a base plate 220 that is joined with a guide plate 230 defining an elongated fastener recess 235. The base plate 220 can be joined with the retainer clip 240. All these components can be similar to same components mentioned above, however, the guide plate 230 can be disposed at an offset angle A6 that is greater than the offset angle of the embodiments above. For example, this offset angle A6 can be optionally about 45° to about 50°, inclusive, or about 45°. The faster guide to 10 thus can be used to advance a fastener into a service of a board at this offset angle A6, which can be more severe and less acute than the angle of the embodiments above or particular framing applications.

Figure 12:
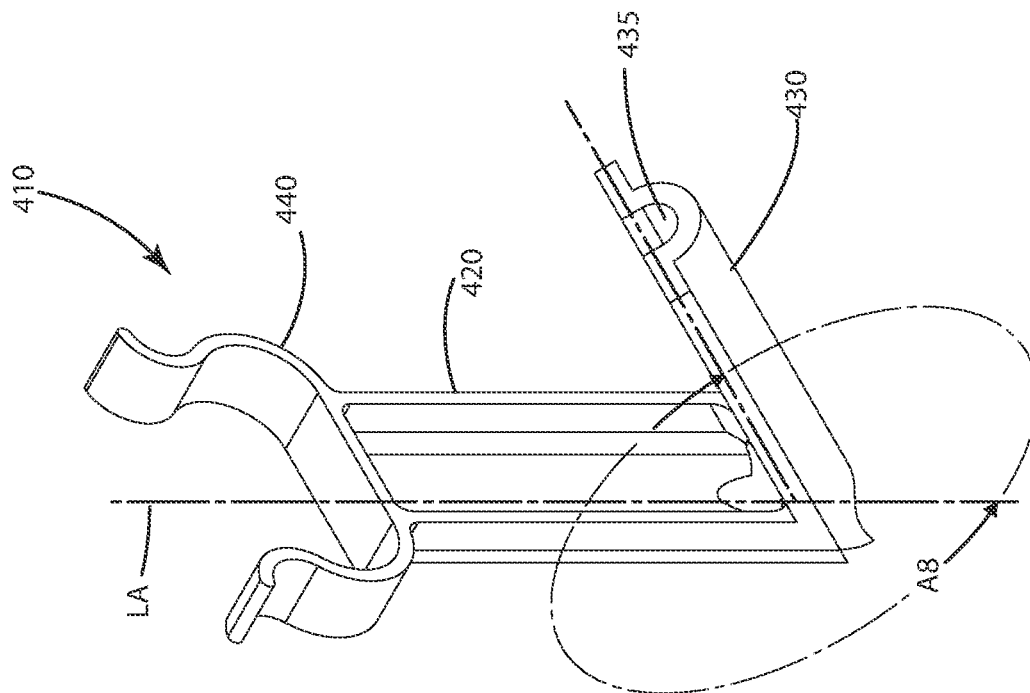
FIG. 12 is an upper perspective view of a fourth alternative embodiment of the fastener guide.
Figure 11:
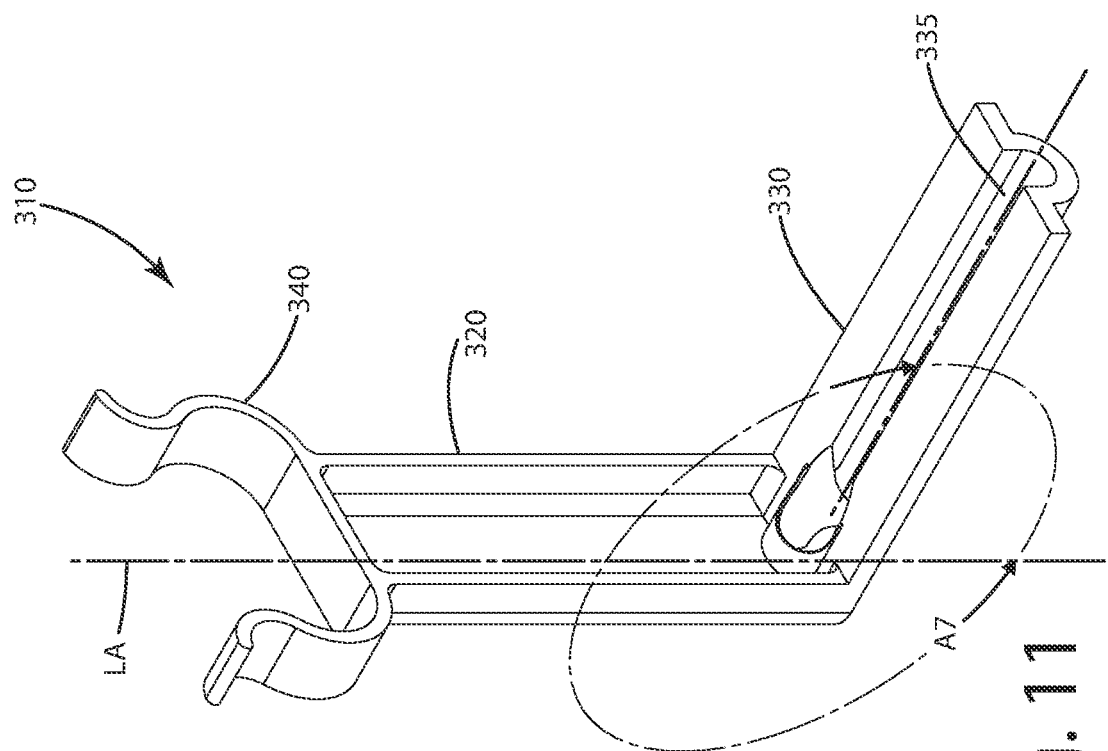
FIG. 11 is an upper perspective view of a third alternative embodiment of the fastener guide.

A third and fourth alternative embodiment of the fastener guide is illustrated in FIGS. 11 and 12 and generally designated 310 and 410. The fastener guides of these embodiments are similar in structure, function and operation to the embodiments described above with several exceptions. For example, the guides 310 and 410 can include respective base plates 320, 420, guide plates 330, 430 and retainer clips 340, 440. The guide plates and respective elongated fastener recesses 335 and 435, however can be offset at right or obtuse offset angles A7 and A8 which optionally can be 90° and 135° as shown. These angles can be selected for specific applications of fasteners at such offset angles relative to a first board and/or second board to connect those boards with a fastener. Of course, the guide plates can be varied in the angles relative to the base plate and thus the angle of orientation and advancement along a drive axis of the fastener guide, depending on the application. These are but two examples of the variety of angles for which the fastener guides can be used.

Figure 13:
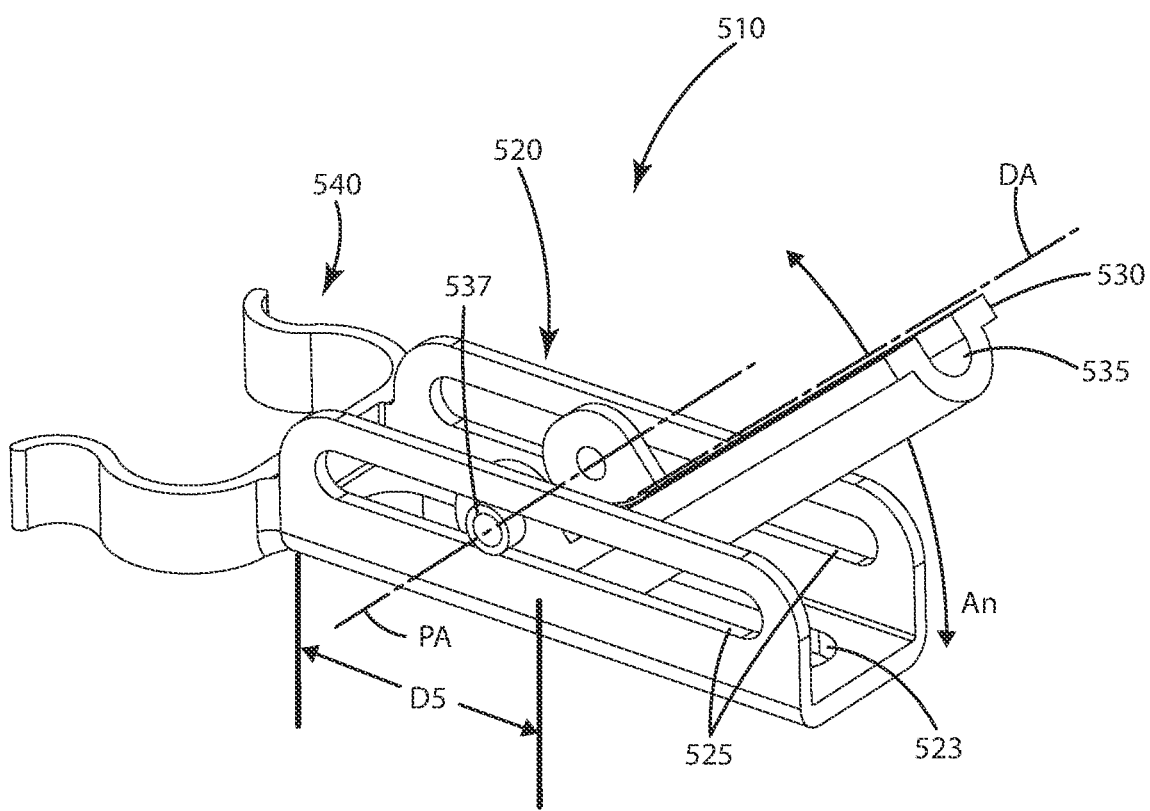
FIG. 13 is an upper perspective view of a fifth alternative embodiment of the fastener guide that is adjustable in length and offset angle.

A fifth alternative embodiment of the fastener guide is illustrated in FIG. 13 and generally designated 510. The fastener guide of this embodiment is similar in structure, function and operation to the embodiments described above with several exceptions. For example, this guide 510 can include a base plate 520 that is joined with a guide plate 530 defining an elongated fastener recess 535. The base plate 520 can be joined with the retainer clip 540. This fastener guide 510, however, can be adjustable in length and in the offset angle An at which the fastener is advanced along a drive axis DA. In particular, the angle An can be adjusted infinitely by pivoting about a pivot axis PA such that the drive axis DA also is varied. The guide plate 530 and the respective elongated fastener recess 535 can be secured to a pivot member 537 that is pivotally disposed in one or more slots 525 of the base plate. The pivot member 537 can pivot about the pivot axis PA so that the offset angle An can be modified. The pivot member 537 also can include a locking mechanism to secure the offset angle. In addition, the pivot member 537 can be slidably received in the elongated slots 525 of the base 520. Thus, the pivot members and associated guide plate 530 can be slid toward and/or away from the retainer clip 540 to adjust the distance DS of the elongated fastener recess 535 from that retainer clip and thus set the distance away from a second board at which the fastener is advanced along the drive axis DA in the guide plate 530. The base 520 also can include a feed aperture 523 that extends a bottom wall of the base 520. The fastener can pass through the elongated fastener axis 535 and through this feed aperture 523 when being advanced along the drive axis DA into a first support board and a second support board at the offset angle An, which again can be varied with this particular faster guide 510.

Figure 14:
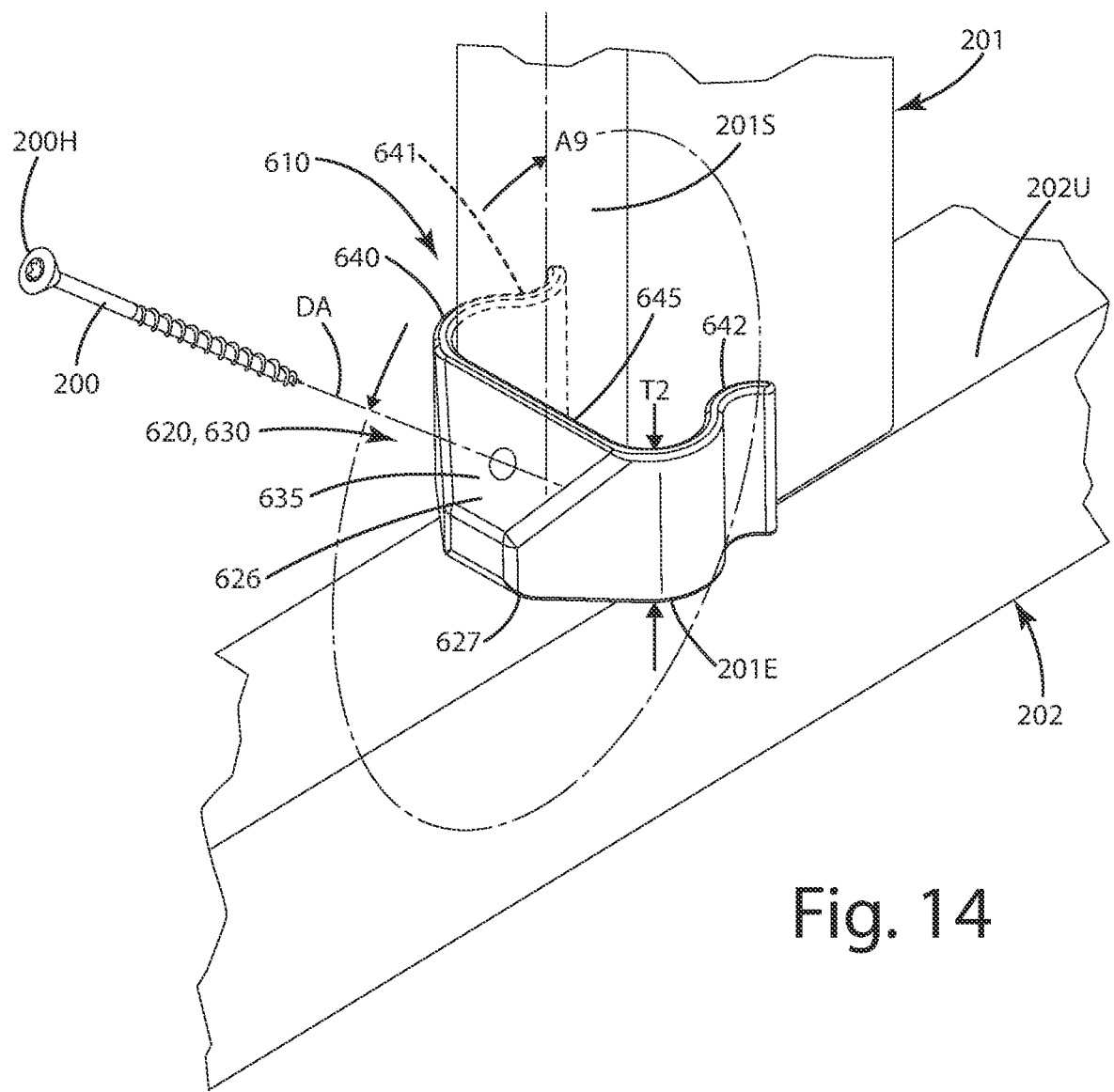
FIG. 14 is an upper perspective view of a sixth alternative embodiment of the fastener guide.

A sixth alternative embodiment of the fastener guide is illustrated in FIG. 14 and generally designated 610. The fastener guide of this embodiment is similar in structure, function and operation to the embodiments described above with several exceptions. For example, this guide 610 can include a base plate 620 that is integrated with a guide plate 630 defining an elongated fastener recess 635. The base plate 620 can be joined with the retainer clip 640. This fastener guide 610, however, can be constructed to connect a first support board 201, which can be a baluster, with a second support board 202, which can be a top rail or bottom rail support, via a fastener 200. With this fastener guide 610, the fastener 200 can be advanced through a side surface 201S of the first board 201, through an end 201E of the first board and into an upper surface, or lower surface depending on the application, of the second support board 202. In turn, this can connect, for example, a baluster to the rail or base.

As shown, the combined base plate and guide 620, 630 can extend from the stop wall 645 that directly engages a side surface 201S of the first support board 201. The first prong 641 and second prong 642 can temporarily and clampingly engage the adjacent side walls of the first support board 201, which again optionally can be a baluster. The elongated fastener recess 635 can be in the form of a through hole that optionally circumferentiates the fastener 200 as it is advanced along a drive axis DA into the first and second boards. The recess 635 can be sized sufficiently so that the fastener head 200H passes completely through the fastener recess 635 upon installation. The combined guide plate and base 620, 630 can further include upper 626 and lower 627 ramped surfaces. These ramped surfaces can allow a drive tool to come closer to the side surface 201S of the first board 201 while advancing a fastener 200. Accordingly, the fastener 200 can be fully advanced into the first support board 201 and second support board 202, with the fastener head 200H directly engaging and/or becoming embedded in the side surface 201S of the first board 201.

Optionally, the first and second prong 641, 642, as well as stop wall 645, can be of a greater thickness T2. This thickness optionally can be at least ½", at least 1", at least 1.5", or at least 2". With this greater thickness T2, the fastener guide can better grab onto and temporarily clamp the first board. Further optionally, in this embodiment, the drive axis DA and the respective elongated fastener recess 635 can be offset at an offset angle A9 relative to the stop wall 645. This offset angle A9 can be the angle at which the fastener is advanced into the side surface 201S of the first support board 201. This offset angle A9 can be any of the offset angles mentioned in the embodiments above.

Figure 15:
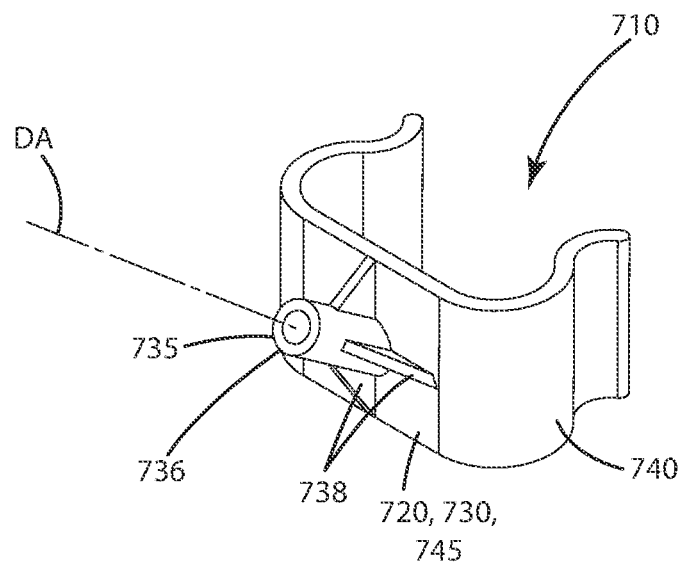
FIG. 15 is an upper perspective view of a seventh alternative embodiment of the fastener guide.

A seventh alternative embodiment of the fastener guide is illustrated in FIG. 15 and generally designated 710. The fastener guide of this embodiment is similar in structure, function and operation to the embodiments described above with several exceptions. For example, this guide 710 can include a base plate 720 that is integrated with a guide plate 730 defining an elongated fastener recess 735. The base plate 720 can be joined with the retainer clip 740. This fastener guide 710, however, can be configured so that the elongated fastener recess 735 is in the form of a tube 736 that projects away from the stop wall 745, which also forms a portion of the combined base plate and/or guide 730. This tube 736 can be supported by buttresses 738 that extend away from and are joined with the stop wall 745. These buttresses 738 can extend around the tube 736 and can be supportive of the tube at the offset angle at which it is placed to support the fastener well.

Figure 16:
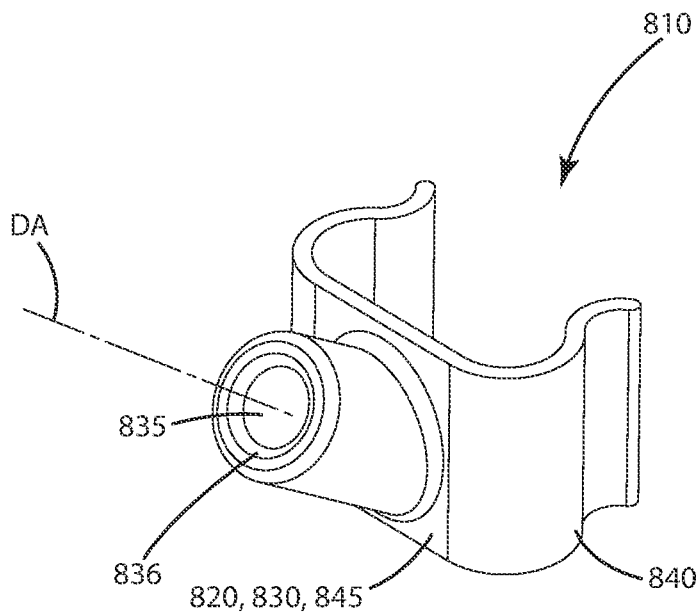
FIG. 16 is an upper perspective view of a eighth alternative embodiment of the fastener guide.

An eighth alternative embodiment of the fastener guide is illustrated in FIG. 16 and generally designated 810. The fastener guide of this embodiment is similar in structure, function and operation to the embodiments described above with several exceptions. For example, this guide 810 can include a base plate 820 that is integrated with a guide plate 830 defining an elongated fastener recess 835. The base plate 820 can be joined with the retainer clip 840. This fastener guide 810, however, can be configured so that the elongated fastener recess 835 is in the form of an enlarged tube 836 that projects away from the stop wall 845, which also forms a portion of the combined base plate and/or guide 830. This tube 836 can have a very thick wall and a large bore that can receive a large diameter head of a fastener passing therethrough.

Figure 17:
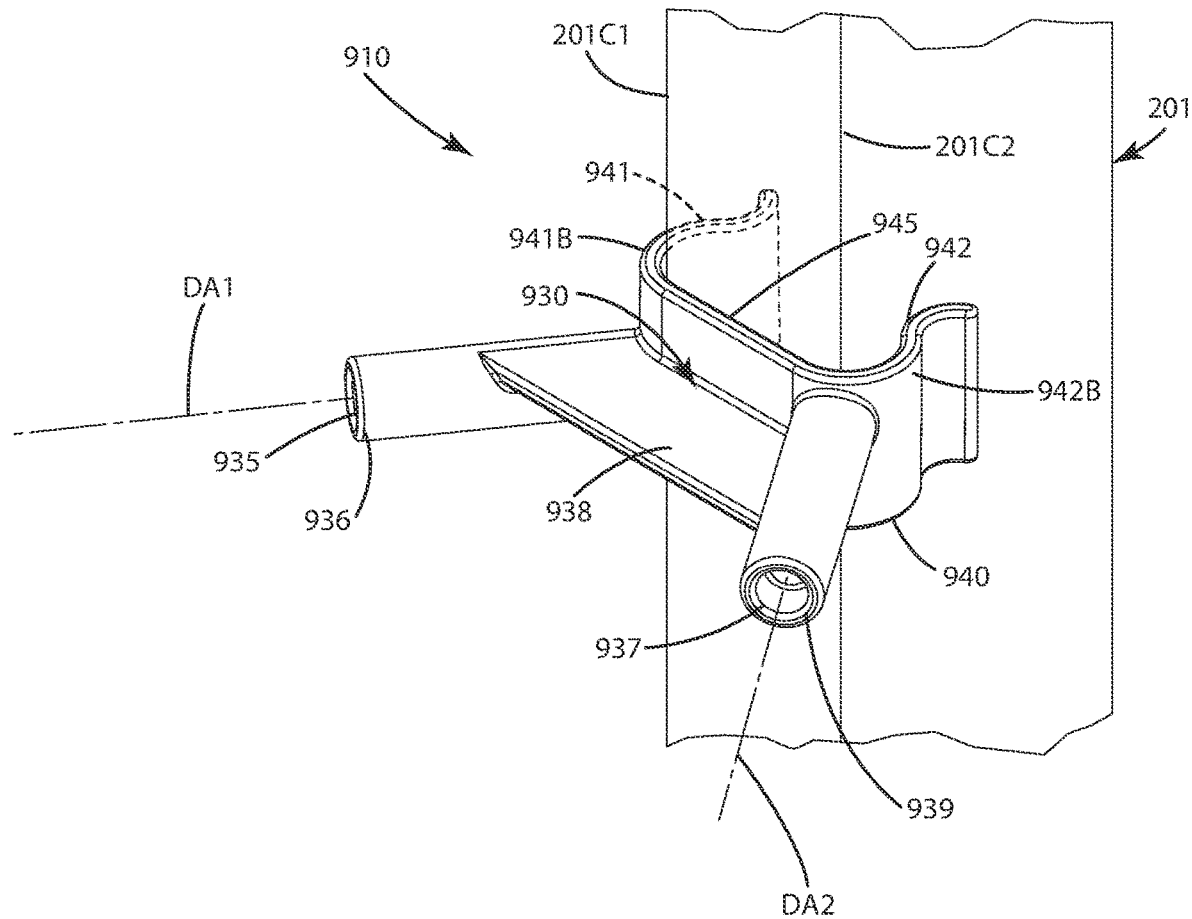
FIG. 17 is an upper perspective view of a ninth alternative embodiment of the fastener guide with two fastener recesses or tubes

A ninth alternative embodiment of the fastener guide is illustrated in FIG. 17 and generally designated 910. The fastener guide of this embodiment is similar in structure, function and operation to the embodiments described above with several exceptions. For example, this guide 910 can include a base plate that is integrated with a guide plate 930 defining an elongated fastener recess 935. The base plate can be joined with the retainer clip 940. This fastener guide 910, however, can be configured so that the elongated fastener recess 935 is in the form of a tube 936 that projects away from the stop wall 945, which also forms a portion of the combined base plate and/or guide 930. The tube 936 can be positioned so that it extends outwardly from a base portion 941B of a prong 941. The tube 936 can define the drive axis DA1. This first drive axis DA1 can be oriented and configured so that it will advance a fastener into a corner 201C1 of a support board 201. The faster guide 910 also can include a buttress 938 that extends and connects to the stop wall 945. This can provide extra support to the tube.

Optionally, the fastener guide 910 can include a second elongated fastener recess 937, which can be in the form of a second tube 939 that extends from the base and/or guide. In particular, the second tube 939 can extend from the stop wall 945 and/or a portion of the second prong 942, optionally the base portion 942B of the second prong 942. The second tube can guide a second fastener along a second drive axis DA2, and into a second corner 201C2 of the board 201 that is distal from the first corner 201C1. Thus, with the fastener guide 910, two or more fasteners can be advanced along the different drive axes into the respective corners of the board 201 while the retainer clip 940 holds the fastener guide 910 and aligns the tubes 936, 939 relative to those corners and/or side surfaces at predetermined offset angles.

Figure 18:
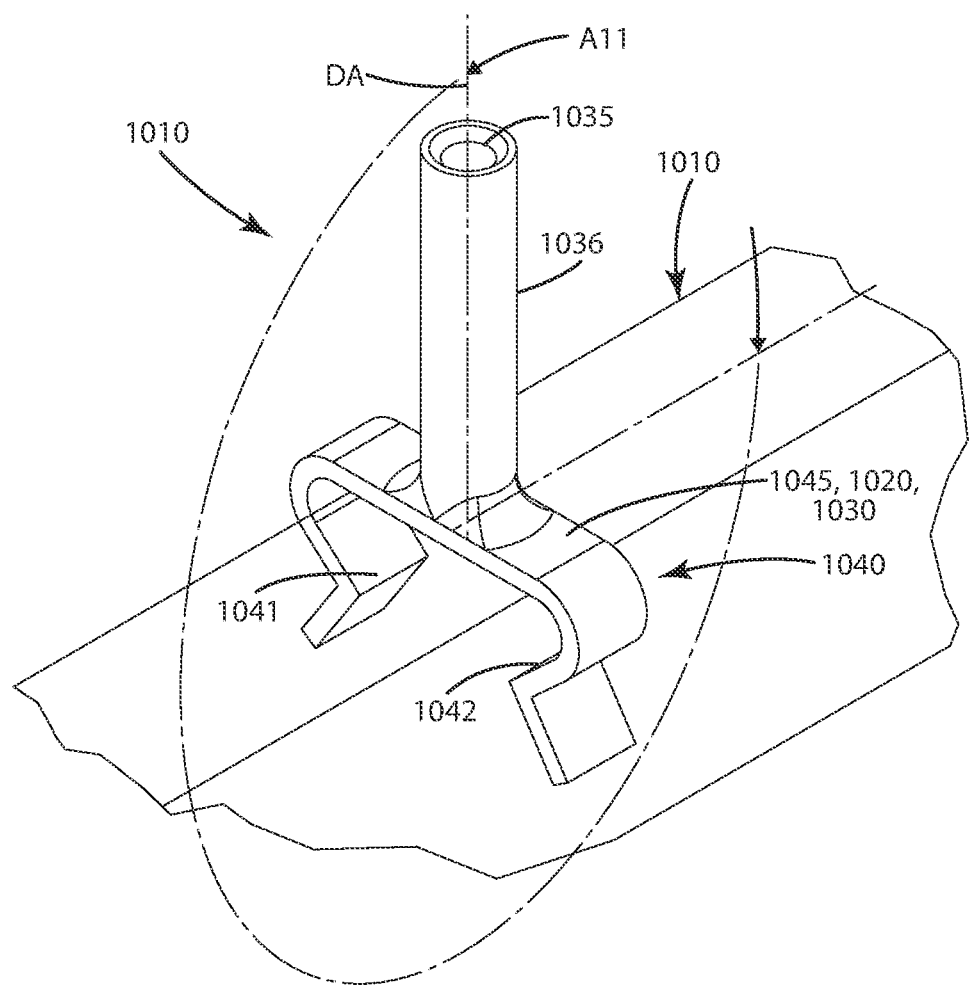
FIG. 18 is an upper perspective view of a tenth alternative embodiment of the fastener guide with a tube guide secured directly to the retainer clip.

A tenth alternative embodiment of the fastener guide is illustrated in FIG. 18 and generally designated 1010. The fastener guide of this embodiment is similar in structure, function and operation to the embodiments described above with several exceptions. For example, this guide 1010 can include a base plate 1020 that is integrated with a guide plate 1030 defining an elongated fastener recess 1035. The base plate 1020 can be joined with the retainer clip 1040. This fastener guide 1010, however, can include an elongated fastener recess 1035 formed via a tube 1036 that projects orthogonally from the combined stop wall 1045, base 1020 and guide 1030 of the guide 1010. This tube 1036 can be joined directly with the retainer clip 1040 and can project orthogonally from the stop wall 1045 thereof. The prongs 1041 and 1042 can, as with the embodiments above, project away from the stop wall generally in an opposite direction from the tube 1036. This tube 1036 optionally can be used to advance a fastener along the drive axis DA within the tube 1036 such that the fastener advances into a first board 1101 orthogonally. The retainer clip 1040 and the respective prongs 1041 and 1042 can secure the tube 1036 and the elongated recess 35 at the offset angle A11 as this occurs. This angle A11 optionally can be 90°.

Figure 19:
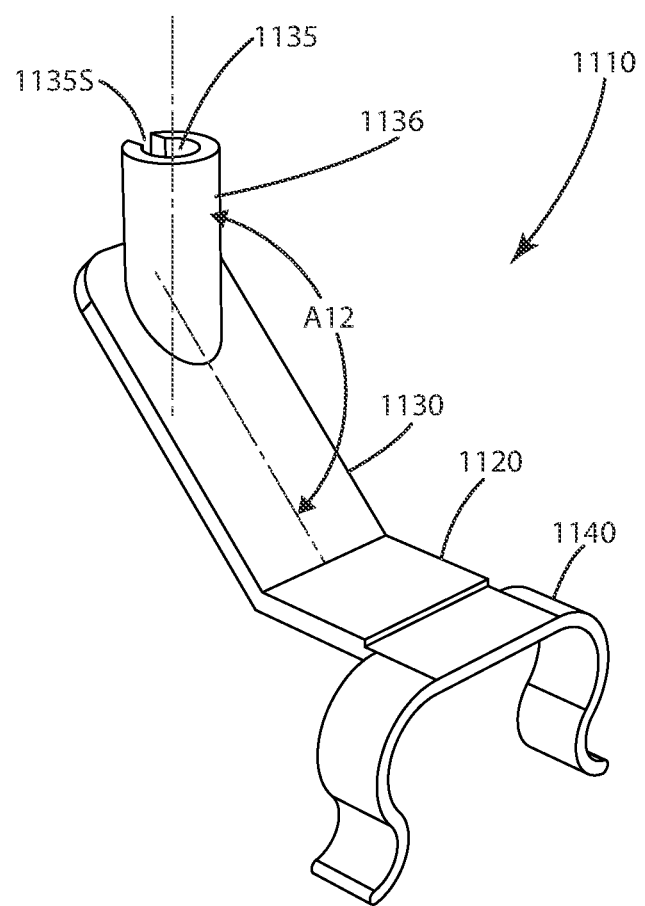
FIG. 19 is an upper perspective view of an eleventh alternative embodiment of the fastener guide.

An eleventh alternative embodiment of the fastener guide is illustrated in FIG. 19 and generally designated 1110. The fastener guide of this embodiment is similar in structure, function and operation to the embodiments described above with several exceptions. For example, this guide 1110 can include a base plate 1120 that is integrated with a guide plate 1130 defining an elongated fastener recess 1135. The base plate 1120 can be joined with the retainer clip 1140. This fastener guide 1110, however, can include a guide plate 1130 to which a tube 1136 is joined and defines the elongated fastener recess 1135. The tube 1136 can define a slot 1135S such that the guide and tube can be removed from a fastener in the tube by sliding the tube transverse to the fastener and off the fastener. This tube 1036 can be offset relative to the guide plate 1130 by and offset angle A12, which can be selected based on the application.

Figure 20:
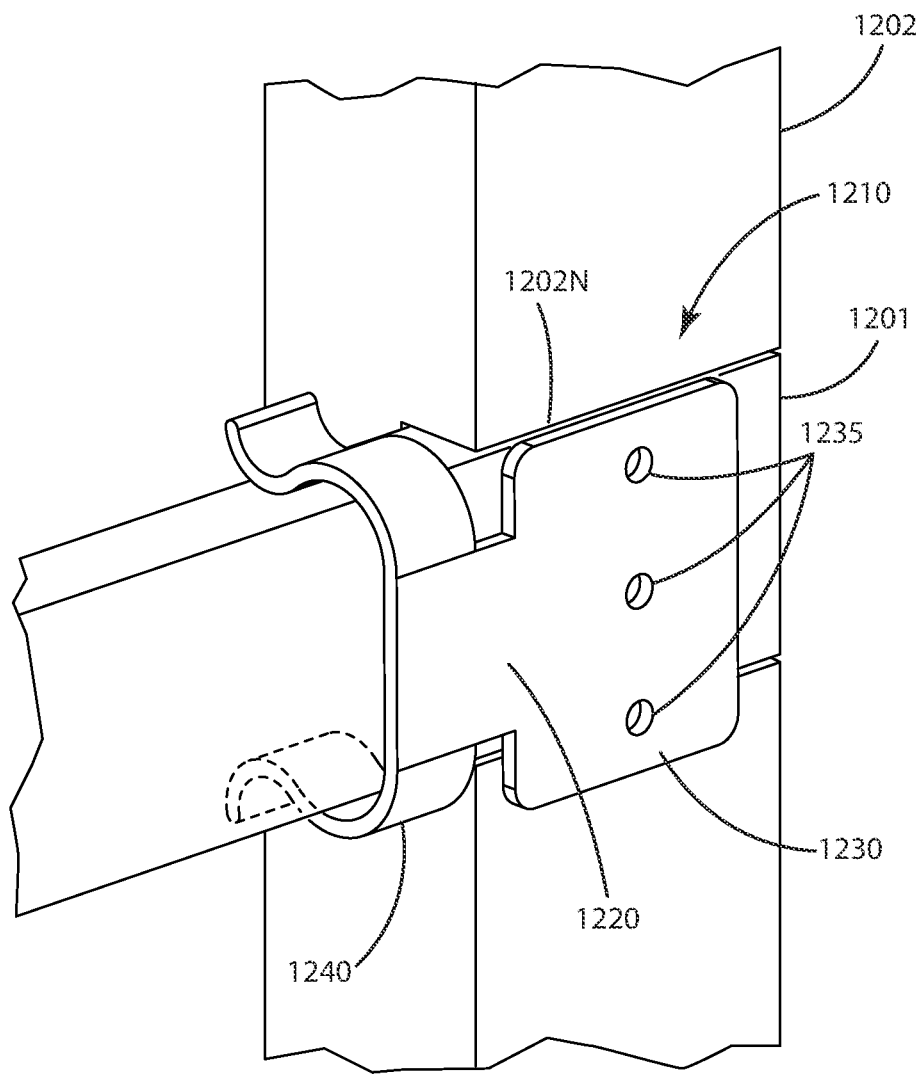
FIG. 20 is an upper perspective view of a twelfth alternative embodiment of the fastener guide suitable for attaching a fence board to a post.

A twelfth alternative embodiment of the fastener guide is illustrated in FIG. 20 and generally designated 1210. The fastener guide of this embodiment is similar in structure, function and operation to the embodiments described above with several exceptions. For example, this guide 1210 can include a base plate 1220 that is integrated with a guide plate 1230. This guide plate, however, can define multiple elongated fastener recesses 1235. These multiple fastener recesses can be configured to allow a user to advance multiple different fasteners through each of the respective recesses and secure a first board 1201 to a second board 1202. The first board 1201 optionally can be a fence board and the second board 1202 can be a post having a notch 1202N defined therein. The fastener guide thus can be used to install it with fasteners advanced through the fence board to secure it to the fence post.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A fastener guide comprising:

an elongated base plate including a first end and a second end, an engagement surface and an outer surface, the base engagement surface configured to engage a first support board along a length of the elongated base plate, the elongated base plate including a longitudinal axis;

a retainer clip joined with the elongated base plate at the first end, the retainer clip including a stop wall that is perpendicular to the longitudinal axis, the stop wall configured to engage a second support board that is perpendicular to the first support board, the retainer clip comprising:

a first prong extending in a first direction away from the stop wall on a first side of the longitudinal axis, the first prong being inwardly directed toward the longitudinal axis and having a first prong engagement surface configured to engage the second support board on a first side of the second support board while the base engagement surface engages the first support board along the length, the first prong engagement surface being resiliently biased toward the longitudinal axis, the first prong including a first prong ramp configured to guide the first prong onto the second support board, a second prong, distal from the first prong, extending in a second direction away from the stop wall on a second opposing side of the longitudinal axis, the second prong being inwardly directed toward the longitudinal axis and having a second prong engagement surface configured to engage the second support board on a second side of the second support board while the base engagement surface engages the first support board along the length, the second prong engagement surface being resiliently biased toward the longitudinal axis, the second prong including a second prong ramp configured to guide the second prong onto the second support board, the second prong engagement surface being spaced a gap width that is less than 1.5" from the first prong engagement surface to form a gap therebetween, the gap width configured to increase when the first ramp and the second ramp are urged into engagement with the second support board; and a guide plate joined with the base plate at the second end, the guide plate disposed at an offset angle and extending transversely above a plane of the outer surface of the base plate, the guide plate including a guide wall forming an elongated fastener recess that intersects the plane and that is configured to rotationally constrain a fastener rotating therein as the fastener advances into the first support board so as to advance the fastener at the offset angle relative to the first support board, wherein the retainer clip clampingly secures the elongated base plate and guide plate in a fixed orientation relative to the first support board and second support board as the fastener advances into the first support board so that a user need not manually engage the guide and hold the guide as the fastener advances into the first support board, wherein the elongated fastener recess is disposed above the base engagement surface, wherein the guide is removable from the fastener after the fastener is at least advanced into the first support board, wherein the first prong and the second prong are disengaged from the second support board when the guide is moved distal from the fastener installed in the first support board and the second support board.

2. The fastener guide of claim 1,
wherein the offset angle is between 22° and 158°, inclusive, relative to the plane.

3. The fastener guide of claim 2,
wherein the offset angle is about 23°.

4. The fastener guide of claim 1,
wherein the base plate includes a hump wall that extends upward from the outer surface;
wherein the hump wall cooperates with the guide wall to circumferentiate the fastener as the fastener is advanced.

5. The fastener guide of claim 4,
wherein the hump wall intersects and is joined with the guide plate.

6. The fastener guide of claim 1 comprising:
a first support wall extending away from the stop wall toward the guide plate, the first support wall extending upward from the elongated base plate on a first side of the longitudinal axis; and
a second support wall extending away from the stop wall toward the guide plate, the second support wall extending upward from the elongated base plate on a second side of the longitudinal axis, distal from the first support wall.

7. The fastener guide of claim 6,
wherein the first support wall includes a first proximal end and a first distal end,
wherein the second support wall includes a second proximal end and a second distal end,
wherein the first proximal end and the second proximal end are joined with the guide plate,
wherein the first distal end and the second distal end are joined with the stop wall.

8. The fastener guide of claim 1,
wherein the elongated base plate has a base width,
wherein the ratio of the base width to the gap width is less than 1:1.

9. The fastener guide of claim 1,
wherein the first ramp extends outward from the first prong engagement surface and includes a first round contour that is convexly oriented relative to the longitudinal axis,
wherein the second ramp extends outward from the second prong engagement surface and includes a second round contour that is convexly oriented relative to the longitudinal axis.

10. The fastener guide of claim 1,
wherein the base plate and the guide plate cooperatively form a feed aperture that is in communication with the elongated fastener recess,
wherein the feed aperture is distal from the retainer clip.

11. A fastener guide comprising:
an elongated base plate including a longitudinal axis and configured to engage a first support board;
a retainer clip joined with the elongated base plate, the retainer clip configured to engage a second support board that is perpendicular to the first support board, the retainer clip comprising a first prong having a first prong engagement surface configured to engage the second support board on a first side of the second support board and a second prong, distal from and opposing the first prong, the second prong having a second prong engagement surface configured to engage the second support board on a second side of the second support board; and
a guide plate joined with the base plate distal from the retainer clip, the guide plate including an elongated fastener recess that is disposed at an offset angle from the base plate and that is configured to rotationally constrain a fastener rotating therein as the fastener advances into the first support board so as to advance the fastener at the offset angle relative to the first support board, wherein the retainer clip is configured to temporarily clamp the guide to second support board in a hands-free manner as the fastener advances into the first and second support boards.

12. The fastener guide of claim 11, wherein the second prong engagement surface is spaced a gap width that is less than 1.5" from the first prong engagement surface to form a gap therebetween, the gap width configured to increase when the first ramp and the second ramp are urged into engagement with the second support board.

13. The fastener guide of claim 12, wherein the elongated base plate has a base width, wherein the ratio of the base width to the gap width is less than 1:1.

14. The fastener guide of claim 11, wherein the elongated fastener recess is disposed above the base engagement surface so that when the fastener is fully advanced into the first support board and the second support board, the fastener does not interfere with removal of the guide from the second support board, in which the first prong and the second prong are disengaged from the second support board and the guide is moved distal from the fastener installed in the first support board and the second support board.

15. The fastener guide of claim 11, wherein the offset angle is between 22° and 158°, inclusive, relative to the plane.

16. The fastener guide of claim 15, wherein the offset angle is about 23°, wherein the first support board includes a vertical surface, wherein the second support board is a part of a truss, wherein the fastener is a screw having a plurality of threads and a fastener length of at least 4", wherein the second prong engagement surface is spaced a gap width that is less than 1.5" from the first prong engagement surface to form a gap therebetween, wherein the elongated base plate has a base width, wherein the ratio of the base width to the gap width is less than 1:1.

* * * * *